(12) United States Patent
Hirano et al.

(10) Patent No.: US 7,483,614 B2
(45) Date of Patent: Jan. 27, 2009

(54) OPTICAL FIBER AND OPTICAL DEVICE USING THE SAME

(75) Inventors: Masaaki Hirano, Yokohama (JP);
Tetsuya Nakanishi, Yokohama (JP);
Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 135 days.

(21) Appl. No.: 11/516,517

(22) Filed: Sep. 7, 2006

(65) Prior Publication Data
US 2007/0053641 A1 Mar. 8, 2007

Related U.S. Application Data

(60) Provisional application No. 60/714,340, filed on Sep. 7, 2005.

(51) Int. Cl.
*G02B 6/02* (2006.01)
(52) U.S. Cl. .................. 385/124; 385/100; 385/123; 385/126; 385/127; 385/128; 359/337; 359/337.5; 398/81; 398/147; 398/148; 372/6
(58) Field of Classification Search ................. 385/124, 385/100, 123, 126, 127, 128; 359/337, 337.5; 398/81, 147, 148; 372/6
See application file for complete search history.

(56) References Cited

U.S. PATENT DOCUMENTS

| | | | |
|---|---|---|---|
| 6,459,525 B1 | 10/2002 | Aso et al. | |
| 7,079,769 B1 * | 7/2006 | Tsukitani et al. | 385/127 |
| 7,292,748 B2 * | 11/2007 | Tsukitani et al. | 385/24 |
| 2004/0234216 A1 | 11/2004 | Okuno et al. | |
| 2005/0163444 A1 | 7/2005 | Miyabe et al. | |
| 2006/0245689 A1 * | 11/2006 | Tsukitani et al. | 385/24 |
| 2007/0053641 A1 * | 3/2007 | Hirano et al. | 385/124 |

FOREIGN PATENT DOCUMENTS

| | | |
|---|---|---|
| EP | 0 938 018 A1 | 8/1999 |
| EP | 1 209 497 A2 | 5/2002 |
| JP | 08-095106 | 4/1996 |

OTHER PUBLICATIONS

European Search Report issued in corresponding European Patent Application No. EP 06119941.0 dated Jan. 10, 2007.
Floridia, C. et al., "Optimization of spectrally flat and broadband single-pump fiber optic parametric amplifiers," Optics Communications, Jan. 26, 2003, p. 381-388, vol. 223.
Dainese, P. et al., "Designing fiber dispersion for broadband parametric amplifiers," SBMO/IEEE MTT-S International Conference, Jul. 20, 2005, p. 92-95, Piscataway, NJ.

(Continued)

*Primary Examiner*—James P Hughes
(74) *Attorney, Agent, or Firm*—McDermott Will & Emery LLP

(57) ABSTRACT

There is disclosed an optical fiber wherein an absolute value of the fourth order dispersion $\beta_4$ of fourth derivative $\beta_4$ of propagation constant $\beta$ with respect to angular frequency $\omega$ at a mean zero dispersion wavelength $\lambda_0$ in an overall length is not more than $5 \times 10^{-56}$ s$^4$/m and wherein a fluctuation of a zero dispersion wavelength along a longitudinal direction is not more than ±0.6 nm.

12 Claims, 36 Drawing Sheets

OTHER PUBLICATIONS

McKerracher, R. et al., "Optimising Broadband Tunable Wavelength Conversion In Fibre Optical Parametric Amplifiers," CLEO/Pacific Rim—The 5th Pacific Rim Conference on Lasers and Electro-optics, Dec. 15-19, 2003, p. 473, Piscataway, NJ.

M. E. Marhic, et al., "Toward Practical Fiber Optical Parametric Amplifiers and Oscillators" Optics & Photonics News (Sep. 2004) pp. 21-25 (2004).

M-C. Ho, et al., "200-nm-Bandwidth Fiber Optical Amplifier Combining Parametric and Raman Gain" J. of Lightwave Technol. vol. 19, No. 7, pp. 977-981 (2001).

M. Gao, et al., "Optimized Design on Two-pump Fiber Optical Parametric Amplifier with Two-section Nonlinear Fibers Using Genetic Algorithm" Optics Express, vol. 12, No. 23, pp. 5603-5613 (2004).

T. Okuno, et al., "Novel Wavelength Converter Based on Four-wave Mixing Inside a Fiber Raman Laser Composed of a Highly-nonlinear Dispersion Shifted Fiber" OFC 2004, MF21.

J. Hiroishi, et al., "Dispersion Slope Controlled HNL-DSF with high γ of 25 W-1 km -1 and Band Conversion Experiment Using This Fiber" ECOC2002 Post Deadline Papers, PD1 (2002).

O. Aso, et al., "Broadband Four-wave Mixing Generation In Short Optical Fibres" Electronics Letters, vol. 36, No. 8 (2000).

L. F. Mollenauer, et al., "Method for Facile and Accurate Measurement of Optical Fiber Dispersion Maps" Optical Society of America, vol. 21, No. 21, pp. 1724-1726 (1996).

K. Inoue "Four-wave Mixing in an Optical Fiber in the Zero-Dispersion Wavelength Region" J. of Lightwave Technol. vol. 10, No. 11, pp. 1553-1561, Nov. 1992.

European Search Report issued in European Patent Application No. EP 06 119 941.0, mailed Oct. 16, 2007.

Karlsson, M., "Four-wave mixing in fibers with randomly varying zero-dispersion wavelength", Journal of the Optical Society of America B (Optical Physics), Aug. 1998, pp. 2269-2275, vol. 15 No. 8, Optical Society of America.

Wong, K.K.Y. et al., "Recent Advances in the Design and Implementation of Practical Fiber Optical Parametric Amplifiers," Optoelectronic and Microelectronic Materials and Devices, Dec. 2004, pp. 409-412, Piscataway, NJ.

\* cited by examiner

Fig.4A

WITHOUT VARIATION IN $\lambda 0$

| $\beta_4$ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 204 | 171 | 136 | 114 | 96 |
| 5E-56 | 244 | 206 | 162 | 136 | 114 |
| 1E-56 | 366 | 309 | 242 | 201 | 172 |
| 1E-57 | 675 | 559 | 439 | 366 | 309 |
| 1E-58 | 1320 | 1056 | 810 | 660 | 560 |

Fig.4B

WITH VARIATION OF ±0.05nm IN $\lambda 0$

| $\beta_4$ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 199 | 165 | 129 | 105 | 84 |
| 5E-56 | 235 | 194 | 149 | 120 | 94 |
| 1E-56 | 335 | 269 | 196 | 147 | 109 |
| 1E-57 | 488 | 349 | 220 | 155 | 109 |
| 1E-58 | 502 | 351 | 220 | 155 | 110 |

Fig.4C

WITH VARIATION OF ±0.10nm IN $\lambda 0$

| $\beta_4$ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 194 | 158 | 120 | 96 | 73 |
| 5E-56 | 226 | 184 | 135 | 103 | 75 |
| 1E-56 | 304 | 232 | 153 | 109 | 77 |
| 1E-57 | 351 | 246 | 155 | 109 | 77 |
| 1E-58 | 351 | 247 | 156 | 109 | 77 |

Fig.5A

WITH VARIATION OF ±0.20nm IN λ0

| β₄ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 183 | 146 | 105 | 77 | 55 |
| 5E-56 | 208 | 162 | 109 | 77 | 55 |
| 1E-56 | 244 | 174 | 109 | 77 | 55 |
| 1E-57 | 247 | 174 | 109 | 77 | 55 |
| 1E-58 | 247 | 174 | 110 | 77 | 55 |

Fig.5B

WITH VARIATION OF ±0.60nm IN λ0

| β₄ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 140 | 98 | 63 | 44 | 32 |
| 5E-56 | 141 | 100 | 63 | 44 | 32 |
| 1E-56 | 141 | 100 | 63 | 44 | 32 |
| 1E-57 | 141 | 100 | 63 | 44 | 32 |
| 1E-58 | 142 | 100 | 63 | 45 | 32 |

Fig.5C

WITH VARIATION OF ±1.0nm IN λ0

| β₄ [s⁴/m] \ FIBER LENGTH [m] | 50 | 100 | 250 | 500 | 1000 |
|---|---|---|---|---|---|
| | WAVELENGTH CONVERSION BANDWIDTH [nm] | | | | |
| 1E-55 | 108 | 77 | 49 | 35 | 25 |
| 5E-56 | 109 | 77 | 49 | 35 | 25 |
| 1E-56 | 109 | 77 | 49 | 35 | 25 |
| 1E-57 | 109 | 77 | 49 | 35 | 25 |
| 1E-58 | 109 | 77 | 49 | 35 | 25 |

Fig.12

| Ra | S [ps/nm²/km] | dS/dλ [ps/nm³/km] | $\beta_4$ [s⁴/m] |
|---|---|---|---|
| 0.2 | 0.0318 | -9.69E-05 | -5.42E-56 |
| 0.3 | 0.0317 | -9.74E-05 | -5.24E-56 |
| 0.4 | 0.0312 | -1.02E-04 | -3.89E-56 |
| 0.5 | 0.0298 | -1.07E-04 | -1.73E-56 |
| 0.55 | 0.0289 | -1.08E-04 | -8.02E-57 |
| 0.6 | 0.0287 | -1.08E-04 | -6.41E-57 |
| 0.65 | 0.0286 | -1.06E-04 | -9.75E-57 |
| 0.7 | 0.0289 | -1.04E-04 | -1.63E-56 |
| 0.8 | 0.0306 | -9.82E-05 | -4.19E-56 |

*Fig.13*

| Ra | S [ps/nm²/km] | dS/dλ [ps/nm³/km] | $\beta_4$ [s⁴/m] |
|---|---|---|---|
| 0.2 | 0.031 | -1.06E-04 | -2.94E-56 |
| 0.3 | 0.0309 | -1.07E-04 | -2.67E-56 |
| 0.4 | 0.0304 | -1.11E-04 | -1.48E-56 |
| 0.45 | 0.0298 | -1.14E-04 | -4.19E-57 |
| 0.46 | 0.0296 | -1.15E-04 | -6.47E-58 |
| 0.5 | 0.029 | -1.17E-04 | 7.99E-57 |
| 0.6 | 0.0278 | -1.19E-04 | 2.13E-56 |
| 0.7 | 0.028 | -1.15E-04 | 1.18E-56 |
| 0.74 | 0.0286 | -1.11E-04 | -8.54E-58 |
| 0.8 | 0.0298 | -1.08E-04 | -1.61E-56 |

*Fig.15*

| Ra | S [ps/nm²/km] | dS/dλ [ps/nm³/km] | $\beta_4$ [s⁴/m] |
|---|---|---|---|
| 0.2 | 0.0325 | -8.00E-05 | -9.48E-56 |
| 0.3 | 0.0324 | -8.05E-05 | -9.30E-56 |
| 0.4 | 0.032 | -8.29E-05 | -8.48E-56 |
| 0.5 | 0.0312 | -8.50E-05 | -7.41E-56 |
| 0.55 | 0.031 | -8.49E-05 | -7.27E-56 |
| 0.6 | 0.0309 | -8.42E-05 | -7.33E-56 |
| 0.65 | 0.031 | -8.30E-05 | -7.66E-56 |
| 0.7 | 0.0312 | -8.19E-05 | -8.05E-56 |
| 0.8 | 0.0321 | -7.97E-05 | -9.23E-56 |

*Fig.16*

| Ra | S [ps/nm²/km] | dS/dλ [ps/nm³/km] | β₄ [s⁴/m] |
|---|---|---|---|
| 0.2 | 0.0311 | -8.15E-05 | -8.05E-56 |
| 0.3 | 0.031 | -8.25E-05 | -7.76E-56 |
| 0.4 | 0.0301 | -8.74E-05 | -6.03E-56 |
| 0.5 | 0.0287 | -9.16E-05 | -4.04E-56 |
| 0.55 | 0.0281 | -9.16E-05 | -3.56E-56 |
| 0.6 | 0.028 | -9.03E-05 | -3.75E-56 |
| 0.65 | 0.0282 | -8.80E-05 | -4.38E-56 |
| 0.7 | 0.0287 | -8.55E-05 | -5.30E-56 |
| 0.8 | 0.0304 | -8.10E-05 | -7.59E-56 |

Fig.17

| Ra | S [ps/nm²/km] | dS/dλ [ps/nm³/km] | β₄ [s⁴/m] |
|---|---|---|---|
| 0.2 | 0.0298 | -8.29E-05 | -6.72E-56 |
| 0.3 | 0.0296 | -8.44E-05 | -6.25E-56 |
| 0.4 | 0.0283 | -9.20E-05 | -3.63E-56 |
| 0.5 | 0.0261 | -9.86E-05 | -5.04E-57 |
| 0.55 | 0.0254 | -9.86E-05 | 5.74E-58 |
| 0.6 | 0.0251 | -9.67E-05 | -9.55E-58 |
| 0.65 | 0.0254 | -9.33E-05 | -1.04E-56 |
| 0.7 | 0.0261 | -8.94E-05 | -2.41E-56 |
| 0.8 | 0.0287 | -8.26E-05 | -5.90E-56 |

Fig.19

| Ra | S [ps/nm²/km] | dS [ps/nm³/km] | $\beta_4$ [s⁴/m] |
|---|---|---|---|
| 0.2 | 0.0271 | -8.55E-05 | -4.02E-56 |
| 0.3 | 0.0268 | -8.81E-05 | -3.24E-56 |
| 0.4 | 0.0245 | -1.02E-04 | 1.48E-56 |
| 0.5 | 0.0209 | -1.14E-04 | 6.85E-56 |
| 0.55 | 0.0198 | -1.14E-04 | 7.73E-56 |
| 0.6 | 0.0193 | -1.10E-04 | 7.31E-56 |
| 0.65 | 0.0199 | -1.05E-04 | 5.79E-56 |
| 0.7 | 0.0211 | -9.37E-05 | 2.49E-56 |
| 0.8 | 0.0252 | -8.62E-05 | -2.35E-56 |

OPTICAL FIBER AND OPTICAL DEVICE USING THE SAME

CROSS-REFERENCE TO RELATED APPLICATION

This application claims priority to Provisional Application Ser. No. 60/714340 filed on Sep. 7, 2005 by the same Applicant, which is hereby incorporated by reference in its entirety.

BACKGROUND OF THE INVENTION

1. Field of the Invention

The present invention relates to a highly nonlinear optical fiber and an optical device using the optical fiber.

2. Related Background Art

In wavelength conversion or the like using the nonlinear optical phenomena, a highly nonlinear optical fiber such as a dispersion-shifted fiber is used as a medium to cause the nonlinear optical phenomena (e.g. Japanese Patent Application Laid-Open No. 8-95106). The development of optical fiber in such usage has been focused heretofore mainly on improvement in nonlinearity and decrease of the dispersion slope. It is also important to reduce the variation in the zero dispersion wavelength. However, the decrease of the dispersion slope leads to increase of variation in the zero dispersion wavelength in the longitudinal direction of the filter. In addition, no attention has been directed heretofore to the fourth order dispersion $\beta_4$ of the fourth derivative $\beta_4$ of the propagation constant $\beta$ by angular frequency, which is important to improvement in the wavelength conversion bandwidth.

For example, a reference of "M. E. Marhic, et al., Optics & Photonics News (September 2004) pp. 21-25 (2004)" describes that the bandwidth in an OPA (optical parametric amplifier) is expanded by decrease of the fourth order dispersion $\beta_4$ of optical fiber. Furthermore, for example, a reference of "M-C. Ho, et al., J. of Lightwave Technol. Vol. 19, No. 7, pp. 977-981 (2001)" reports wide-band OPA using the optical fiber with the fourth order dispersion $\beta_4$ being $-5.8 \times 10^{-56}$ $s^4/m$. However, there is the description "large variation of dispersion" in the section "B. Experimental Setup for OPA Gain Measurement" on page 978 in this "M-C. Ho, et al., J. of Lightwave Technol. Vol. 19, No. 7, pp. 977-981 (2001)", and the decrease of the fourth order dispersion $\beta_4$ is insufficient. A reference of "M. Gao, et al., Optics Express, Vol. 12, No. 23, pp.5603-5613 (2004)" describes execution of optimization of fiber parameters including the fourth order dispersion $\beta_4$, but fails to give consideration to such phenomena as variation in the zero dispersion wavelength and coupling of orthogonal polarization mode which must be significant issues in practical fiber.

As discussed above, there were proposals on the fiber parameters from the viewpoint of use of optical fiber, but there was no study from the aspect of production of optical fiber; it was thus difficult to produce an optical fiber with the parameters as proposed. For example, a reference of "T. Okuno, et al., OFC 2004, MF21" and other references describe such known fibers as an optical fiber having the conversion bandwidth of 91.3 nm in the fiber length of 100 m and an optical fiber having the conversion bandwidth of 110 nm in the fiber length of 100 m, but they were achieved by simply shortening the optical fibers, without optimization of the dispersion parameters.

A reference of "J. Hiroishi, et al., ECOC2002 Post Deadline Papers, PD1 (2002)" describes an optical fiber with a so-called W-shape index profile including a center core part, a depressed part, and a cladding part, and shows $1.0 \times 10^{-4}$ $ps^4/km$ ($=1.0 \times 10^{-55}$ $s^4/m$) as a typical value of the fourth order dispersion $\beta_4$. In fact, the value of the fourth order dispersion $\beta_4$ can be adjusted even in the case of the W-shape index profile, but no consideration is given to the significance of the fourth order dispersion $\beta_4$. The wide bandwidth is achieved by decreasing the dispersion slope to +0.013 $ps/nm^2/km$, but the wavelength conversion bandwidth by four-wave mixing is limited to below 40 nm, presumably, because of large fluctuation in the zero dispersion wavelength in the longitudinal direction in practice.

The Inventor discovered that the fourth order dispersion $\beta_4$ could be adjusted in practical optical fibers and that a wider bandwidth could be achieved actually in the wavelength conversion, OPA, etc. by decreasing the fourth order dispersion $\beta_4$ and suppressing the variation in the zero dispersion wavelength in the length direction of optical fiber, thereby accomplishing the present invention.

SUMMARY OF THE INVENTION

The present invention has been accomplished in order to improve the above and an object of the invention is to provide an optical fiber capable of achieving a wider bandwidth in the wavelength conversion, OPA, etc. and an optical device using the optical fiber.

An optical fiber according to the present invention is an optical fiber wherein an absolute value of the fourth order dispersion $\beta_4$ for the derivative propagation constant $\beta$ of with respect to angular frequency $\omega$ at a mean zero dispersion wavelength $\lambda_0$ in an overall length is not more than $5 \times 10^{-56}$ $s^4/m$ and wherein a fluctuation of a zero dispersion wavelength along a longitudinal direction is not more than $\pm 0.6$ nm. By using the optical fiber as described above, it becomes feasible to achieve a wider bandwidth in the wavelength conversion, OPA, etc. by four-wave mixing and to achieve, for example, the wavelength conversion bandwidth of 200 nm. A method of measuring the zero dispersion wavelength along the longitudinal direction of optical fiber is described, for example, in Document "L. F. Mollenauer, et al., Optics Lett., Vol. 21, No. 21, pp. 1724-1726 (1996)." Although the optical fiber may be a holey fiber with holes along the longitudinal direction, the optical fiber of the present invention can be a solid one, which facilitates production, fusion splicing with another optical fiber, and control of the zero dispersion wavelength along the longitudinal direction. The absolute value of the fourth order dispersion $\beta_4$ is preferably not more than $1 \times 10^{-56}$ $s^4/m$ and more preferably not more than $5 \times 10^{-57}$ $s^4/m$.

The optical fiber according to the present invention is preferably configured so that the mean zero dispersion wavelength $\lambda_0$ is in the range of 1440 nm to 1640 nm. This wavelength band includes the S-band (1460 nm-1530 nm), C-band (1530 nm-1565 nm), and L-band (1565 nm-1625 nm), which are the bands generally used in optical communications, and it is easy to acquire an inexpensive high-output laser source in the bands.

The optical fiber according to the present invention is preferably configured so that an effective area at the mean zero dispersion wavelength $\lambda_0$ is not more than 15 $\mu m^2$. In this case, the nonlinearity becomes so significant as to enable efficient wavelength conversion.

The optical fiber according to the present invention is preferably configured so that a dispersion slope at the mean zero dispersion wavelength $\lambda_0$ is not less than +0.018 $ps/nm^2/km$. In this case, it is relatively easy to suppress the variation in the zero dispersion wavelength along the longitudinal direction.

The dispersion slope at the mean zero dispersion wavelength $\lambda_0$ is more preferably +0.018 to +0.030 ps/nm²/km.

The optical fiber according to the present invention is preferably configured so that a wavelength derivative of the dispersion slope at the mean zero dispersion wavelength $\lambda_0$ is in the range of −0.00012 ps/nm³/km to −0.00008 ps/nm³/km. In this case, it is relatively easy to suppress the variation in the zero dispersion wavelength.

The optical fiber according to the present invention is preferably configured so that a polarization mode dispersion at the overall length is not more than 0.2 ps. In this case, it is feasible to make influence of the polarization mode dispersion relatively small and to exhibit the nonlinear optical phenomena over a long period of time and on a stable basis. In the case of a non-polarization-maintaining fiber, the polarization mode dispersion is desirably as small as possible, preferably not more than 0.1 ps, and more preferably not more than 0.05 ps.

The optical fiber according to the present invention is preferably configured so that a crosstalk between orthogonal polarization components of fundamental mode light guided is not more than −15 dB at the overall length. In this case, where the optical fiber is a polarization-maintaining fiber, the influence of the polarization mode dispersion can be substantially ignored, and it is feasible to exhibit the nonlinear optical phenomena over a long period of time with extremely stability.

The optical fiber according to the present invention is preferably configured as follows: it further comprises at least a center core part having a maximum refractive index $N_1$ and an outside diameter $2a$, a depressed part surrounding the center core part and having a minimum refractive index $N_2$ and an outside diameter $2b$, and a cladding part surrounding the depressed part and having a maximum refractive index $N_3$; the refractive indices satisfy a relation of "$N_1 > N_3 > N_2$"; with respect to the refractive index $N_3$ of the cladding part, a relative index difference of the center core part is defined as $\Delta_+$ and a relative index difference of the depressed part as $\Delta_-$, and a difference "$\Delta_+ - \Delta_-$" is not less than 2.2%; and a ratio Ra of the respective outside diameters of the center core part and the depressed part ($=2a/2b$) is in the range of 0.2 to 0.7. When the optical fiber has the so-called W-shape index profile and when the relative index difference $\Delta_+$ of the center core part, the relative index difference $\Delta_-$ of the depressed part, and the ratio Ra satisfy the conditions as described above, it becomes easy to adjust the dispersion characteristics and to reduce the absolute value of the fourth order dispersion $\beta_4$. The difference "$\Delta_+ - \Delta_-$" is preferably not less than 3.1% and in this case, the nonlinear coefficient can be increased to 20/W-km or more. The relative index difference $\Delta_-$ of the depressed part is preferably in the range of −0.1% to −1.1% and in this case, the absolute value of the fourth order dispersion $\beta_4$ can be further reduced.

The optical fiber according to the present invention is preferably configured so that the fiber length is not more than 500 m. This facilitates expansion of the wavelength conversion bandwidth.

Another optical fiber according to the present invention is an optical fiber wherein a mean zero dispersion wavelength $\lambda_0$ in an overall length is in the range of 1440 nm to 1640 nm, wherein a fluctuation of a zero dispersion wavelength along a longitudinal direction is not more than ±0.6 nm, and wherein an absolute value of the fourth order dispersion $\beta_4$ of propagation constant $\beta$ with respect to frequency $\omega$, at the mean zero dispersion wavelength $\lambda_0$ is not more than $5 \times 10^{-56}$ s⁴/m, an effective area is not more than 15 μm², a dispersion slope is in the range of +0.018 ps/nm²/km to +0.030 ps/nm²/km, and a wavelength derivative of the dispersion slope is in the range of −0.00012 ps/nm³/km to −0.00008 ps/nm³/km.

An optical device according to the present invention is an optical device comprising: an optical fiber; a pump light source for generating a pump light of a wavelength $\lambda_P$; and a probe light source for generating a probe light of a wavelength $\lambda_S$, wherein the pump light and the probe light are guided through the optical fiber and an idler light of a new wavelength $\lambda_I$ is generated from the optical fiber by a nonlinear optical phenomenon. The optical fiber in this optical device is preferably the optical fiber according to the present invention as described above. This optical device induces wavelength conversion by four-wave mixing in the optical fiber to generate the idler light of the new wavelength $\lambda_I$ different from both of the pump wavelength $\lambda_P$ and the probe wavelength $\lambda_S$. Even if the wavelength spacing is wide between the pump wavelength $\lambda_P$ and the probe wavelength $\lambda_S$, the wavelength conversion can be induced effectively. The pump light may be a pump of one wavelength, but may be a plurality of pumps of two or more wavelengths. The probe light may also be a probe of one wavelength, but may be a plurality of probes of two or more wavelengths. When control pulses are injected as the pump light into the optical fiber, the optical device can serve as an optical switch making use of the wavelength conversion, or as an optical demultiplexer. Since the optical device can generate a new photon with the same information as a certain photon of signal light and of a wavelength different from that of the photon, it can also generate a photon pair for quantum encryption communication. Furthermore, the optical device is able to readily produce light of a wavelength at which there is no good light source, and thus it can be applied not only in the optical communication field but also in the other fields.

The optical device according to the present invention is preferably configured as follows: where $P_{P-in}$ stands for a power of the pump light injected into the optical fiber, $P_{S-in}$ for a power of the probe light injected into the optical fiber, and $P_{I-out}$ for a power of the idler light outputted from the optical fiber, each of the wavelength $\lambda_P$ and power $P_{P-in}$ of the pump light is kept constant, and a range of the wavelength $\lambda_S$ of the probe light where a fluctuation rate of a conversion ratio r ($=P_{I-out}/P_{S-in}$) of the respective powers of the idler light and the probe light with change in the wavelength $\lambda_S$ of the probe light is not more than 3 dB, is not less than 100 nm. In this case, the device can achieve the wavelength conversion in an extremely wide band. The pump light may be pumps of two or more wavelengths and even in that case no change is necessary for the condition for the pump light. For example, the optical device is able to collectively convert multi-wavelength signal light in a band including the C-band and L-band, into light in a band including the E-band (1360 nm-1460 nm) and S-band. The range of the wavelength $\lambda_S$ of the probe light where the fluctuation rate of the conversion ratio r is not more than 3 dB, is preferably not less than 160 nm, more preferably not less than 200 nm, and still more preferably not less than 300 nm.

The optical device according to the present invention is preferably configured as follows: where $P_{P-in}$ stands for a power of the pump light injected into the optical fiber, $P_{S-in}$ for a power of the probe light injected into the optical fiber, and $P_{I-out}$ for a power of the idler light outputted from the optical fiber, each of the wavelength $\lambda_p$ and power $P_{P-in}$ of the pump light is kept constant, and with respect to a value of a conversion ratio r ($=P_{I-out}/P_{S-in}$) of the respective powers of the idler light and the probe light when an absolute value of a difference "$\lambda_P - \lambda_S$" between the respective wavelengths of the pump light and the probe light is 5 nm, a change rate of the conversion ratio r when the absolute value of the difference "$\lambda_P$–$\lambda_S$" is not less than 50 nm, is not more than 3 dB. Since the pump wavelength $\lambda_P$ is approximately equal to the zero dispersion wavelength of the optical fiber, if the probe light injected is probes of multiple wavelengths and if the probe wavelengths are close to the pump wavelength, there will arise a problem of four-wave mixing between the probes. However, if the probe wavelengths are located 50 nm or more apart from the zero dispersion wavelength ($\approx$ the pump wavelength), the absolute value of the dispersion is not less than about 1 ps/nm/km and the four-wave mixing between probes is considerably suppressed.

The optical device according to the present invention is preferably configured so that the power $P_{S\text{-}out}$ of the probe light outputted from the optical fiber is larger than the power $P_{S\text{-}in}$ of the probe light injected into the optical fiber. It is feasible to achieve amplification in a wide band by OPA. In addition to an amplifier, the optical device can also serve as a switch or as an optical demultiplexer where control pulses are injected as the pump light.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 4A, 4B and 4C are drawings showing tables of wavelength conversion bandwidths at respective values of the absolute value of the fourth order dispersion $\beta_4$ and the fiber length L, for respective values of variation width of the zero dispersion wavelength $\lambda_0$ of optical fiber.

FIGS. 5A, 5B and 5C are drawings showing tables of wavelength conversion bandwidths at respective values of the absolute value of the fourth order dispersion $\beta_4$ and the fiber length L, for respective values of variation width of the zero dispersion wavelength $\lambda_0$ of optical fiber.

FIG. 12 is a drawing showing a table of the dispersion slope S, the wavelength derivative of the dispersion slope (dS/d$\lambda$), and the fourth order dispersion $\beta_4$ for each of values of ratio Ra.

FIG. 13 is a drawing showing a table of the dispersion slope S, the wavelength derivative of the dispersion slope (dS/d$\lambda$), and the fourth order dispersion $\beta_4$ for each of values of ratio Ra.

FIG. 15 is a drawing showing a table of the dispersion slope S, the wavelength derivative of the dispersion slope (dS/d$\lambda$), and the fourth order dispersion $\beta_4$ for each of values of ratio Ra.

FIG. 16 is a drawing showing a table of the dispersion slope S, the wavelength derivative of the dispersion slope (dS/d$\lambda$), and the fourth order dispersion $\beta_4$ for each of values of ratio Ra.

FIG. 17 is a drawing showing a table of the dispersion slope S, the wavelength derivative of the dispersion slope (dS/d$\lambda$), and the fourth order dispersion $\beta_4$ for each of values of ratio Ra.

FIG. 19 is a drawing showing a table of the dispersion slope S, the wavelength derivative of the dispersion slope (dS/d$\lambda$), and the fourth order dispersion $\beta_4$ for each of values of ratio Ra.

FIG. 27 is a drawing showing the relationship between variation amount of the zero dispersion wavelength $\lambda_0$ and the dispersion slope S with variation of 1% in the core diameter 2a.

DETAILED DESCRIPTION OF THE PREFERRED EMBODIMENTS

Figure 1:
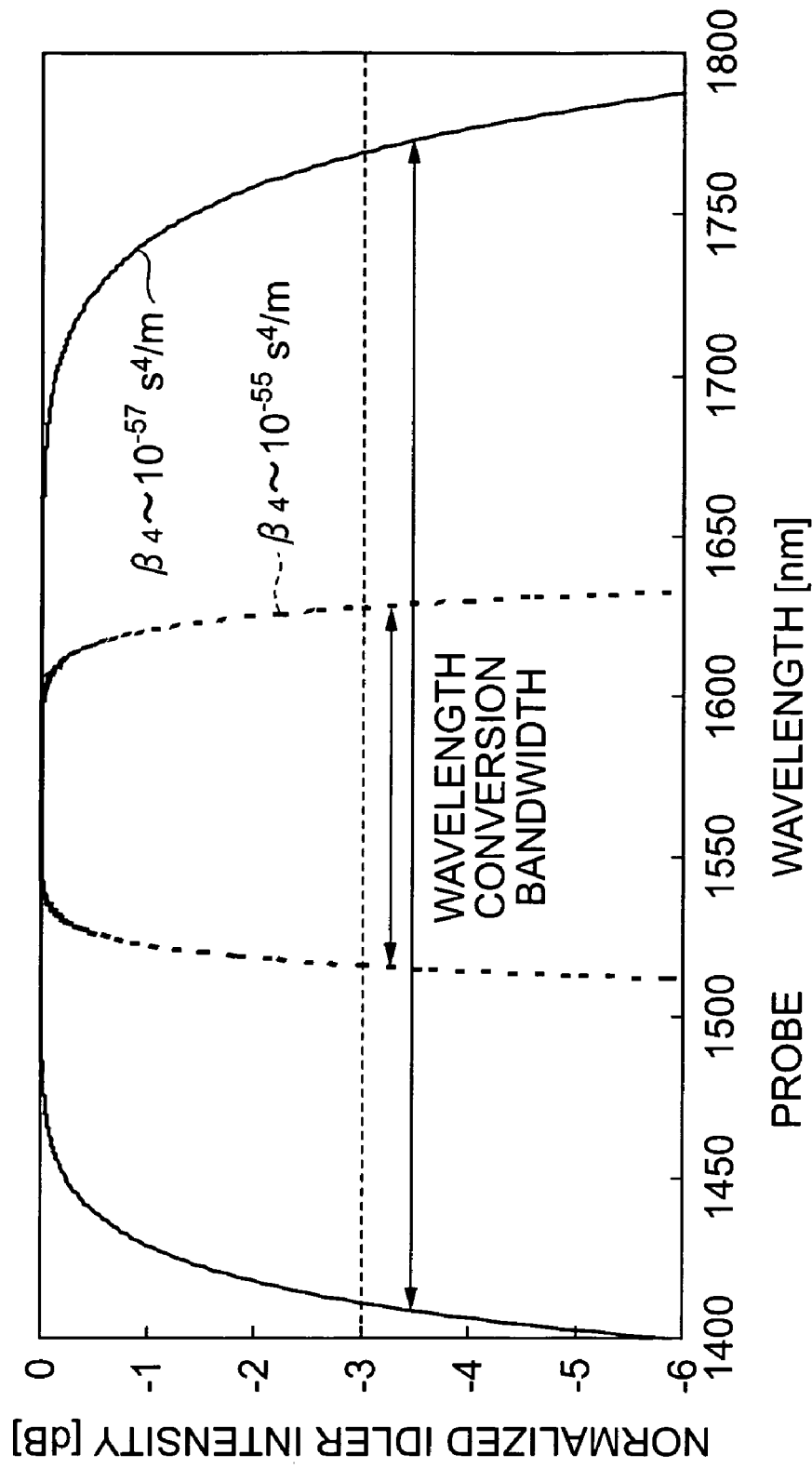
FIG. 1 is a drawing showing the relationship between power $P_{I\text{-}out}$ of idler $\lambda_I$ emitted from optical fiber, and probe wavelength $\lambda_S$.

The best mode for carrying out the present invention will be described below in detail with reference to the accompanying drawings. In the description of drawings the same elements will be denoted by the same reference symbols, without redundant description.

First described are the contents of theoretical study conducted prior to accomplishment of the present invention. Let us consider a situation in which pumps (wavelengths $\lambda_{P1}$, $\lambda_{P2}$) and a probe (wavelength $\lambda_S$) are injected into an optical fiber, a nonlinear optical phenomenon (e.g., four-wave mixing: a kind of parametric process) occurs in the optical fiber, and an idler of a new wavelength (wavelength $\lambda_I$) is generated in the optical fiber by the nonlinear phenomenon. The wavelength $\lambda_{P1}$ and the wavelength $\lambda_{P2}$ may be equal to each other and in that case, these wavelengths are represented by $\lambda_P$.

Let $P_{P1-in}$ be the power of the pump $\lambda_{P1}$ injected into the optical fiber, $P_{P2-in}$ be the power of the pump $\lambda_{P2}$ injected into the optical fiber, and $P_{S-in}$ be the power of the probe $\lambda_S$ injected into the optical fiber. Then the power $P_{I-out}$ of the idler $\lambda_I$ outputted from the optical fiber is represented by Eq (1) and Eq (2) below. $\Delta\beta$ is a phase mismatching amount and is represented by Eq (3) below. $\gamma$ is a nonlinear coefficient of the optical fiber and is represented by Eq (4) below. $L_{eff}$ is an effective length of the optical fiber and is represented by Eq (5) below. The four wavelengths $\lambda_{P1}$, $\lambda_{P2}$, $\lambda_S$, and $\lambda_I$ are assumed to be close to each other, and these wavelengths $\lambda$ are approximated by Eq (6) below. These equations are detailed in Document "K. Inoue et al., J. of Lightwave Technol., Vol. 10, No. 11, pp.1553-1561, (1992)."

Equation 1:

$$P_{I-out} = D\gamma^2 P_{P1-in} P_{P2-in} P_{S-in} L_{eff}^2 \eta \cdot \exp(-\alpha L) \quad (1)$$

Equation 2:

$$\eta = \frac{1}{\alpha^2 + \Delta\beta^2} \{\alpha^2 + 4\exp(-\alpha L) \cdot \sin^2(L \cdot \Delta\beta/2)/L_{eff}^2\} \quad (2)$$

Equation 3:

$$\Delta\beta = \beta_{P1} \beta_{P2} - \beta_S - \beta_I \quad (3)$$

Equation 4:

$$\gamma = \frac{2\pi}{\lambda} \frac{n_2}{A_{eff}} \quad (4)$$

Equation 5:

$$L_{eff} = \frac{1 - \exp(-\alpha L)}{\alpha} \quad (5)$$

Equation 6

$$\lambda = \frac{4}{1/\lambda_{P1} + 1/\lambda_{P2} + 1/\lambda_S + 1/\lambda_I} \quad (6)$$

L is an optical fiber length. $n_2$ is a third-order nonlinear index of the optical fiber at the wavelength $\lambda$. $A_{eff}$ is an effective area of the optical fiber at the wavelength $\lambda$. $\alpha$ is a transmission loss of the optical fiber at the wavelength $\lambda$. $\beta_{P1}$ is a propagation constant of the optical fiber at the wavelength $\lambda_{P1}$, $\beta_{P2}$ is a propagation constant of the optical fiber at the wavelength $\lambda_{P2}$, $\beta_S$ is a propagation constant of the optical fiber at the wavelength $\lambda_S$, and $\beta_I$ is a propagation constant of the optical fiber at the wavelength $\lambda_I$. D is a degeneracy factor. The degeneracy factor takes the value of 1 where the wavelength $\lambda_{P1}$ and the wavelength $\lambda_{P2}$ are equal to each other, and the degeneracy factor takes the value of 4 where the wavelength $\lambda_{P1}$ and the wavelength $\lambda_{P2}$ are different from each other.

Particularly, where the transmission loss a of the optical fiber at the wavelength $\lambda$ is negligible small, the aforementioned Eq (1) can be approximated by Eq (7) below. As seen from this equation, the closer the phase mismatching amount $\Delta\beta$ to the value of 0, the larger the power $P_{I-out}$ of the idler $\lambda_I$ outputted from the optical fiber. The shorter the fiber length L, the smaller the value of "$L\Delta\beta/2$"; therefore, the power $P_{I-out}$ of the idler $\lambda_I$ outputted from the optical fiber is less affected by the phase mismatching amount $\Delta\beta$.

Equation 7:

$$P_{I-out} = D\gamma^2 L^2 P_{P1-in} P_{P2-in} P_{S-in} \left\{\frac{\sin(L \cdot \Delta\beta/2)}{L \cdot \Delta\beta/2}\right\}^2 \quad (7)$$

In addition, Eq (8) below holds from the frequency matching condition. Therefore, Eq (6) above can be transformed into Eq (9) below. In order to implement high-efficiency wavelength conversion in a wide probe wavelength range in the optical fiber, it is desirable to make the phase mismatching amount $\Delta\beta$ represented by Eq (3) above, nearly null in a wide wavelength range. The wavelength $\lambda$ represented by Eq (6) above or by Eq (9) is converted into angular frequency $\omega$, as represented by Eq (10) below. In the equation c represents the speed of light in vacuum.

Equation 8:

$$\omega_I = \omega_{P1} + \omega_{P2} - \omega_S \tag{8a}$$

$$\frac{1}{\lambda_I} = \frac{1}{\lambda_{P1}} + \frac{1}{\lambda_{P2}} - \frac{1}{\lambda_S} \tag{8b}$$

Equation 9:

$$\lambda = \frac{2}{1/\lambda_{P1} + 1/\lambda_{P2}} \tag{9}$$

Equation 10:

$$\omega = \frac{2\pi c}{\lambda} \tag{10}$$

The propagation constant $\beta$ is expressed by Eq (11) below through the Taylor expansion about the angular frequency $\omega$ described in Eq (10). The $n^{th}$ derivative of the propagation constant $\beta$ with respect to angular frequency $\omega$ is represented by Eq (12) below. There are relations represented by Eq (13) to Eq (15) below, of the second derivation $\beta_2$, the third order dispersion $\beta_3$, and the fourth order dispersion $\beta_4$ with the chromatic dispersion D, the dispersion slope S, and the wavelength derivative of the dispersion slope $(dS/d\lambda)$.

Equation 11:

$$\beta = \beta_0 + \sum_{n=1}^{\infty} \frac{1}{n!} \beta_n (\omega - \omega_{P1})^n \tag{11}$$

$$= \beta_0 + \beta_1(\omega - \omega_{P1}) + \frac{1}{2}\beta_2(\omega - \omega_{P1})^2 + \frac{1}{6}\beta_3(\omega - \omega_{P1})^3 +$$

$$\frac{1}{24}\beta_4(\omega - \omega_{P1})^4 + \ldots$$

Equation 12:

$$\beta_n = \frac{d^n \beta}{d\omega^n} \tag{12}$$

Equation 13:

$$\beta_2 = -\frac{\lambda^2}{2\pi c} D \tag{13}$$

Equation 14:

$$\beta_3 = \frac{\lambda^3}{2\pi^2 c^2} D + \frac{\lambda^4}{4\pi^2 c^2} S \tag{14}$$

Equation 15:

$$\beta_4 = -\frac{3\lambda^4}{4\pi^3 c^3} D - \frac{3\lambda^5}{4\pi^3 c^3} S - \frac{3\lambda^6}{8\pi^3 c^3} \frac{dS}{d\lambda} \tag{15}$$

Supposing the wavelength $\lambda_{P1}$ and the wavelength $\lambda_{P2}$ are equal to each other, i.e., to wavelength $\lambda_P$, relations of "$\lambda = \lambda_P$" and "$\omega = \omega_P$" are derived from Eq (9) and Eq (10) above. Therefore, the foregoing Eq (3) is reduced to Eq (16) below, using Eq (8) and Eq (11) above.

Equation (16)

$$\Delta\beta = -\beta_2(\omega_P - \omega_S)^2 - \frac{1}{12}\beta_4(\omega_P - \omega_S)^4 \tag{16}$$

It is seen from this Eq (16) that the absolute value of the phase mismatching amount $\Delta\beta$ becomes smaller with decrease in respective absolute values of the second order dispersion $\beta_2$ and the fourth order dispersion $\beta_4$ at the pump wavelength $\lambda_P$. In addition, it is not always preferable to match the pump wavelength $\lambda_P$ with the zero dispersion wavelength of the optical fiber so as to null the second order dispersion $\beta_2$, and the pump wavelength $\lambda_P$ should be selected in consideration of the influence of the fourth order dispersion $\beta_4$. Namely, where the fourth order dispersion $\beta_4$ is negative, the pump wavelength $\lambda_P$ should be so selected that the second order dispersion $\beta_2$ is positive and that the pump wavelength is thus shorter than the zero dispersion wavelength. Conversely, where the fourth order dispersion $\beta_4$ is positive, the pump wavelength $\lambda_P$ should be so selected that the second order dispersion $\beta_2$ is negative and that the pump wavelength is thus longer than the zero dispersion wavelength.

Next described is the result of further specific analysis based on the result of the analysis described above. FIG. 1 is a drawing showing the relationship between the power $P_{I-out}$ of the idler $\lambda_I$ outputted from the optical fiber, and the probe wavelength $\lambda_S$. The horizontal axis represents the probe wavelength $\lambda_S$, and the vertical axis represents the normalized idler intensity in dB unit. This result was obtained under the following conditions: the pump injected into the optical fiber is a pump of one wavelength, the zero dispersion wavelength $\lambda_0$ of the optical fiber is 1570 nm, the dispersion slope S of the optical fiber at the zero dispersion wavelength $\lambda_0$ is +0.024 ps/nm²/km, the fiber length L of the optical fiber is 100 m, and the transmission loss $\alpha$ of the optical fiber is 0.20/km. The pump wavelength $\lambda_P$ was matched with the zero dispersion wavelength $\lambda_0$ of the optical fiber. Investigation was conducted on how the power $P_{I-out}$ of the idler $\lambda_I$ varied relatively, using the aforementioned Eqs (1) to (6) and Eq (16).

FIG. 1 shows two cases for the fourth order dispersion $\beta_4$, $1\times10^{-55}$ s/m as a general value, and $1\times10^{-57}$ s/m two figures smaller. As shown in FIG. 1, a width of two probe wavelengths at the power of the idler −3 dB or more smaller than a peak value (i.e., full width at half maximum), is defined as "wavelength conversion bandwidth." When the pump wavelength $\lambda_P$ and the zero dispersion wavelength $\lambda_0$ of the optical fiber are equal to each other, the second order dispersion $\beta_2$ of the propagation constant $\beta$ is 0; therefore, as seen from above Eq (16), the wavelength conversion bandwidth becomes wider with decrease in the fourth order dispersion $\beta_4$.

Figure 2A:
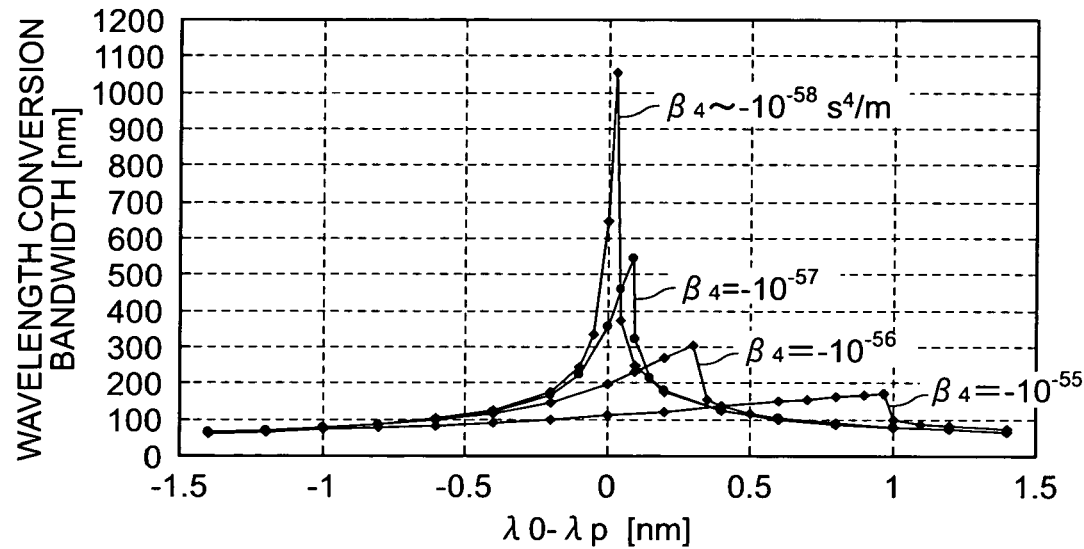
FIGS. 2A and 2B are drawings showing the relationship between wavelength conversion bandwidth and the wavelength difference $\lambda_O$–$\lambda_P$ between zero dispersion wavelength $\lambda_O$ and pump wavelength $\lambda_P$.
Figure 2B:
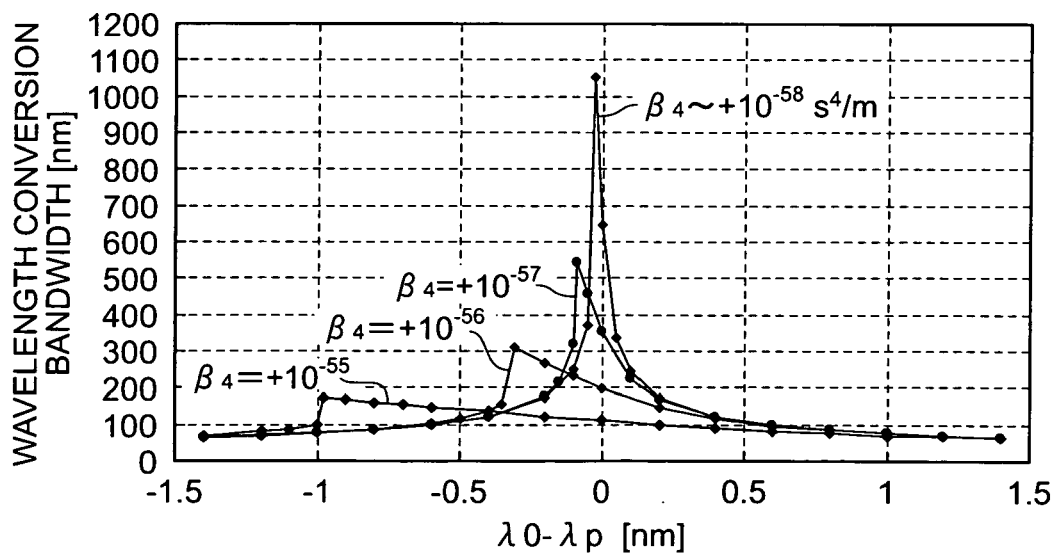

FIGS. 2A and 2B are drawings showing the relationship between the wavelength conversion bandwidth and the pump wavelength $\lambda_P$. The horizontal axis represents "zero dispersion wavelength $\lambda_0$—pump wavelength $\lambda_P$," and the vertical axis the wavelength conversion bandwidth. It is seen from this drawing that the maximum of the wavelength conversion bandwidth becomes larger with decrease in the absolute value of the fourth order dispersion $\beta_4$ and that the absolute value is preferably as small as possible. Where the fourth order dispersion $\beta_4$ is negative, the pump wavelength $\beta_4$ becomes smaller than the zero dispersion wavelength $\lambda_0$ so as to make the second order dispersion $\beta_2$ positive; where the fourth order dispersion $\beta_4$ is positive, the pump wavelength $\lambda_P$ is larger than the zero dispersion wavelength $\lambda_0$ so as to make the second order dispersion $\beta_2$ negative; this is just as indicated by Eq (16). As apparent from a comparison between FIG. 2A and FIG. 2B, with the fourth order dispersion $\beta_4$ having an equal absolute value, the wavelength conversion bandwidths are also approximately equal.

From these FIGS. 2A and 2B, where the fiber length L is 100 m, the wavelength conversion bandwidth becomes wide, not less than 100 nm, and the tolerances of "zero dispersion wavelength $\lambda_0$—pump wavelength $\lambda_P$" are approximately ±0.6 nm. Where the fourth order dispersion $\beta_4$ is $-10^{-55}$ s$^4$/m, the wavelength conversion bandwidth becomes wide, not less than 100 nm, and the tolerances of "zero dispersion wavelength $\lambda_0$—pump wavelength $\lambda_P$" are also ±0.6 nm. Since the pump wavelength $\lambda_P$ is normally kept constant, it is said that it is necessary to suppress the variation in the zero dispersion wavelength $\lambda_0$ of the optical fiber in the range of not more than ±0.6 nm in order to implement the wavelength conversion in a wide band. This optical fiber as suppressed in the variation of the zero dispersion wavelength $\lambda_0$ can be substantialized, for example, by measuring the index profile of an optical fiber preform at each of locations in the longitudinal direction, grinding the contour of the optical fiber preform so as to obtain the optical fiber with desired characteristics based on the measurement result, and drawing the optical fiber preform.

Figure 3:
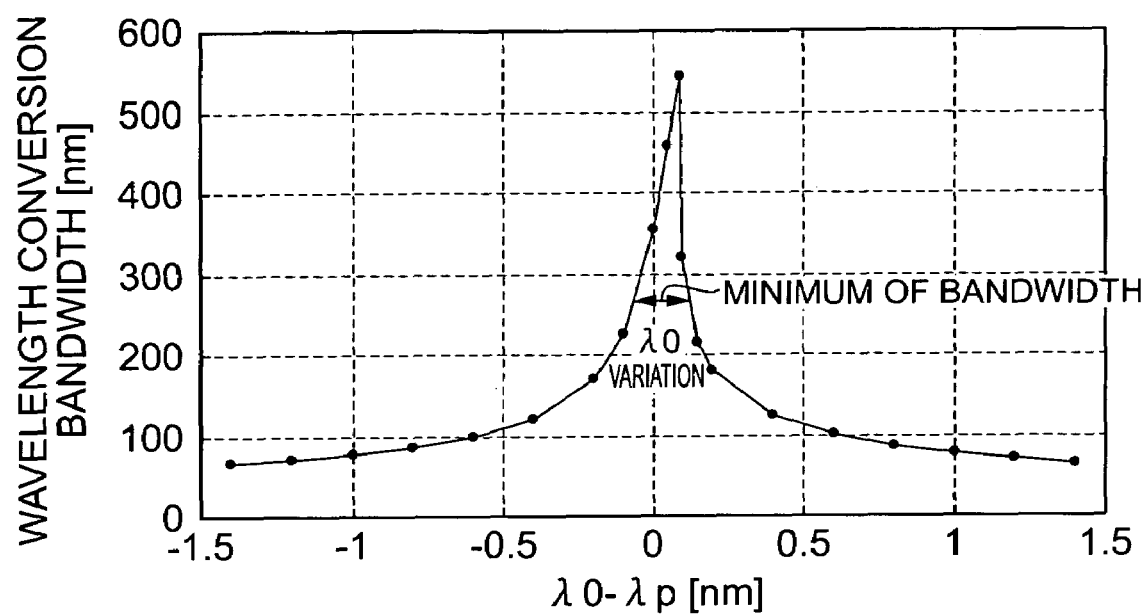
FIG. 3 is a drawing to illustrate a minimum of the wavelength conversion bandwidth in a drawing showing the relationship between wavelength conversion bandwidth and the wavelength difference $\lambda_O$–$\lambda_P$ between zero dispersion wavelength $\lambda_O$ and pump wavelength $\lambda_P$.

In practice, the zero dispersion wavelength $\lambda_0$ of optical fiber varies to some extent in the longitudinal direction and thus the wavelength conversion bandwidth is reduced. Investigation was conducted as to how the minimum of the wavelength conversion bandwidth varied with a certain width of "zero dispersion wavelength $\lambda_0$—pump wavelength $\lambda_P$," to study how the wavelength conversion bandwidth varied with variation in the zero dispersion wavelength $\lambda_0$. FIG. 3 is a drawing to illustrate the minimum of the wavelength conversion bandwidth in a diagram showing the relationship between the wavelength conversion bandwidth and the pump wavelength $\lambda_P$. Each of FIGS. 4A and 4B and 5 is a drawing showing tables of wavelength conversion bandwidths at respective values of the absolute value of the fourth order dispersion $\beta_4$ and the optical fiber length L, for each of values of the variation width of the zero dispersion wavelength $\lambda_0$ of optical fiber.

FIG. 4A shows the wavelength conversion bandwidths assuming no variation in the zero dispersion wavelength $\lambda_0$. FIG. 4B shows the wavelength conversion bandwidths with variation of ±0.05 nm in the zero dispersion wavelength $\lambda_0$. FIG. 4C shows the wavelength conversion bandwidths with variation of ±0.10 nm in the zero dispersion wavelength $\lambda_0$. FIG. 5A shows the wavelength conversion bandwidths with variation of ±0.20 nm in the zero dispersion wavelength $\lambda_0$. FIG. 5B shows the wavelength conversion bandwidths with variation of ±0.60 nm in the zero dispersion wavelength $\lambda_0$. FIG. 5C shows the wavelength conversion bandwidths with variation of ±1.0 nm in the zero dispersion wavelength $\lambda_0$.

Figure 6:
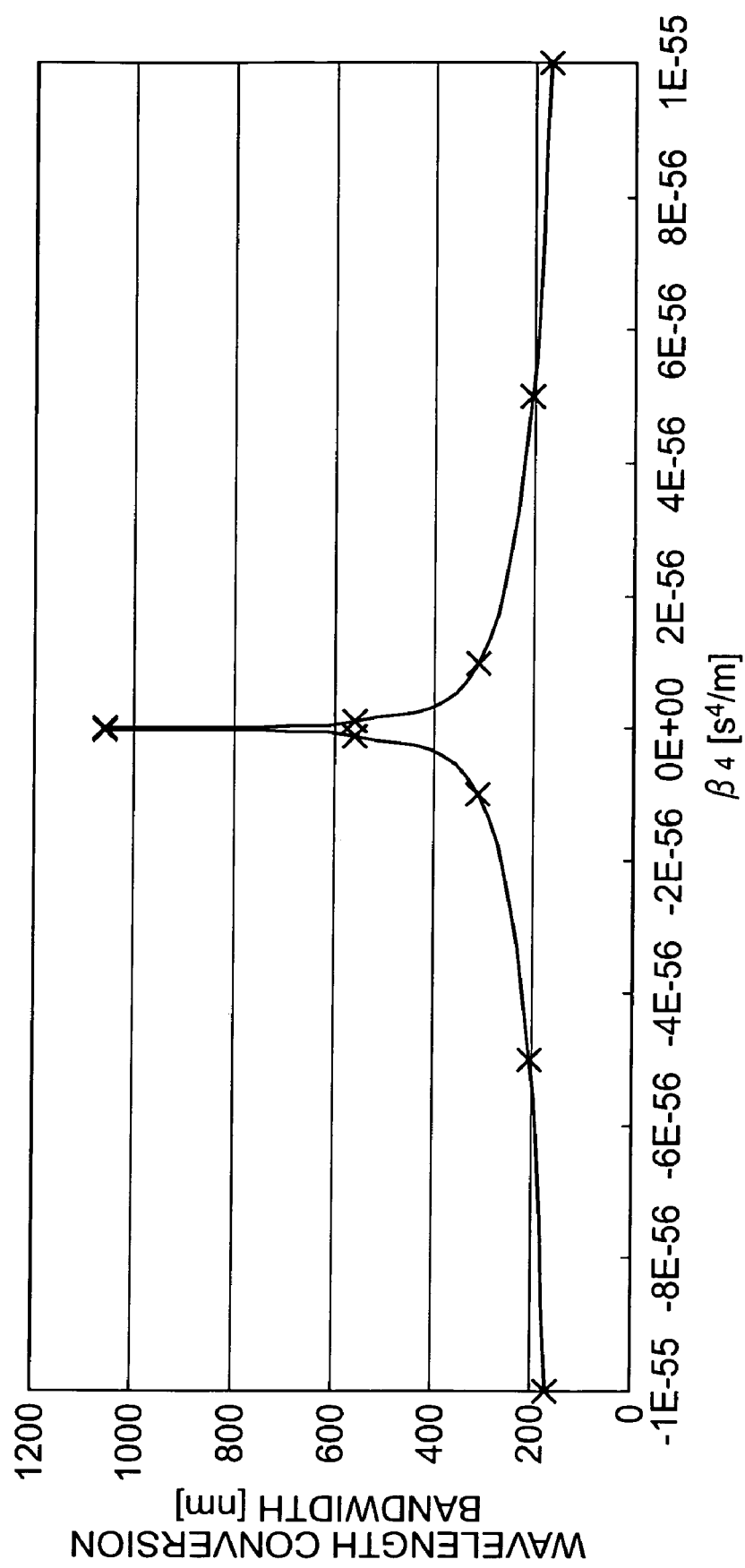
FIG. 6 is a drawing showing the relationship between the wavelength conversion bandwidth and the fourth order dispersion $\beta_4$ in an optical fiber with the fiber length of 100 m without variation in the zero dispersion wavelength $\lambda_0$.

FIG. 4A proves that, without variation in the zero dispersion wavelength $\lambda_0$, the wavelength conversion bandwidth increases with decrease in the fourth order dispersion $\beta_4$. For example, the wavelength conversion bandwidth in the fiber length L of 100 m varies as shown in FIG. 6. FIG. 6 is a drawing showing the relationship between the wavelength conversion bandwidth and the fourth order dispersion $\beta_4$ in the optical fiber with the fiber length of 100 m without variation in the zero dispersion wavelength $\lambda_0$. As shown in this figure, when the absolute value of the fourth order dispersion $\beta_4$ is $1 \times 10^{-55}$ s$^4$/m, which is equivalent to the conventional level, the wavelength conversion bandwidth cannot be 200 nm or more. When the absolute value of the fourth order dispersion $\beta_4$ is not more than $5 \times 10^{-56}$ s$^4$/m, the wavelength conversion bandwidth exceeds 200 nm and is suitable. When the absolute value of the fourth order dispersion $\beta_4$ is not more than $1 \times 10^{-56}$ s$^4$/m, the wavelength conversion bandwidth becomes characteristically large and more than 300 nm. This wavelength conversion bandwidth is preferably 200 nm because it includes the S-band, C-band, and L-band generally used as wavelengths of signal light in optical communications.

Figure 7:
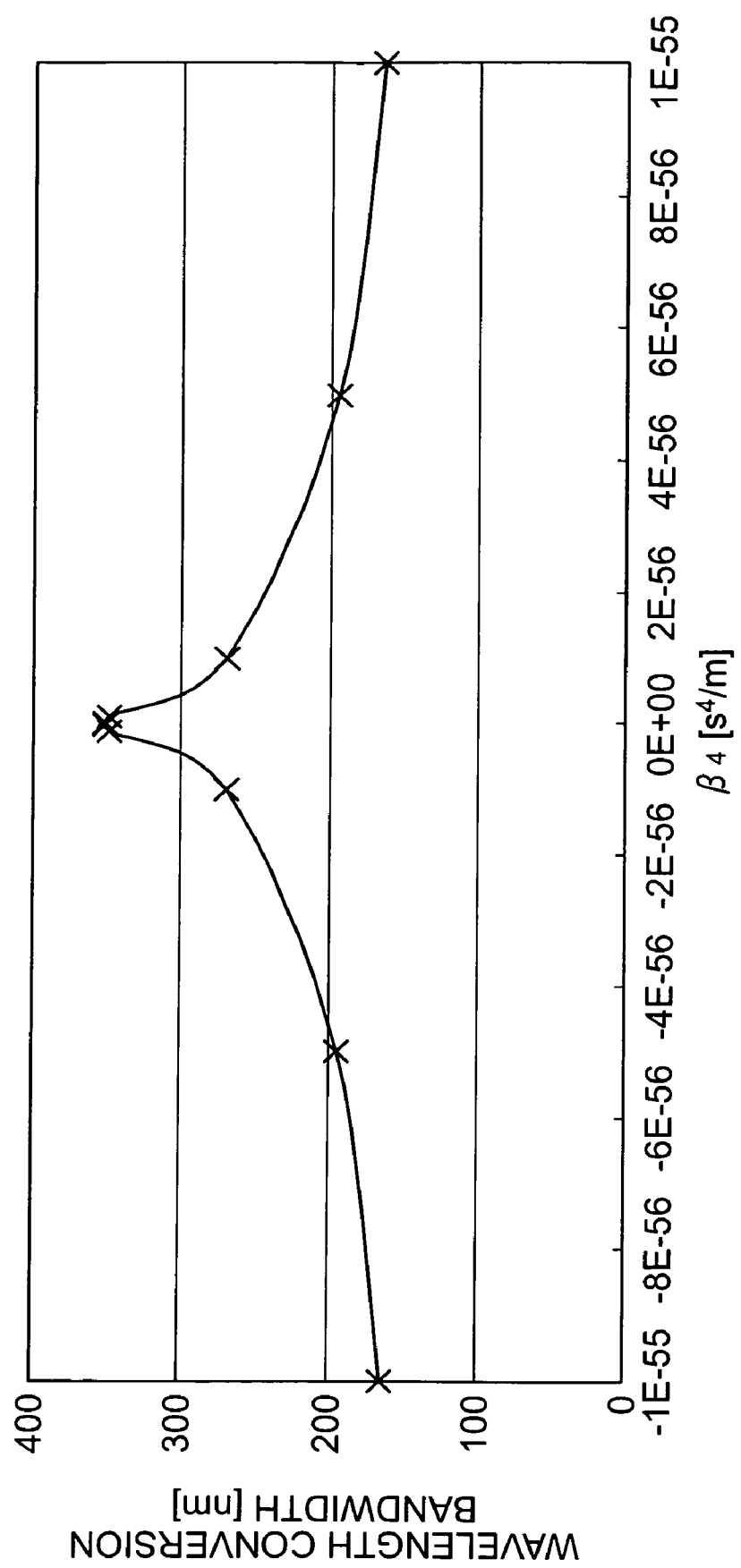
FIG. 7 is a drawing showing the relationship between the wavelength conversion bandwidth and the fourth order dispersion $\beta_4$ in an optical fiber with the fiber length of 100 m with variation of ±0.05 nm in the zero dispersion wavelength $\lambda_0$.
Figure 8:
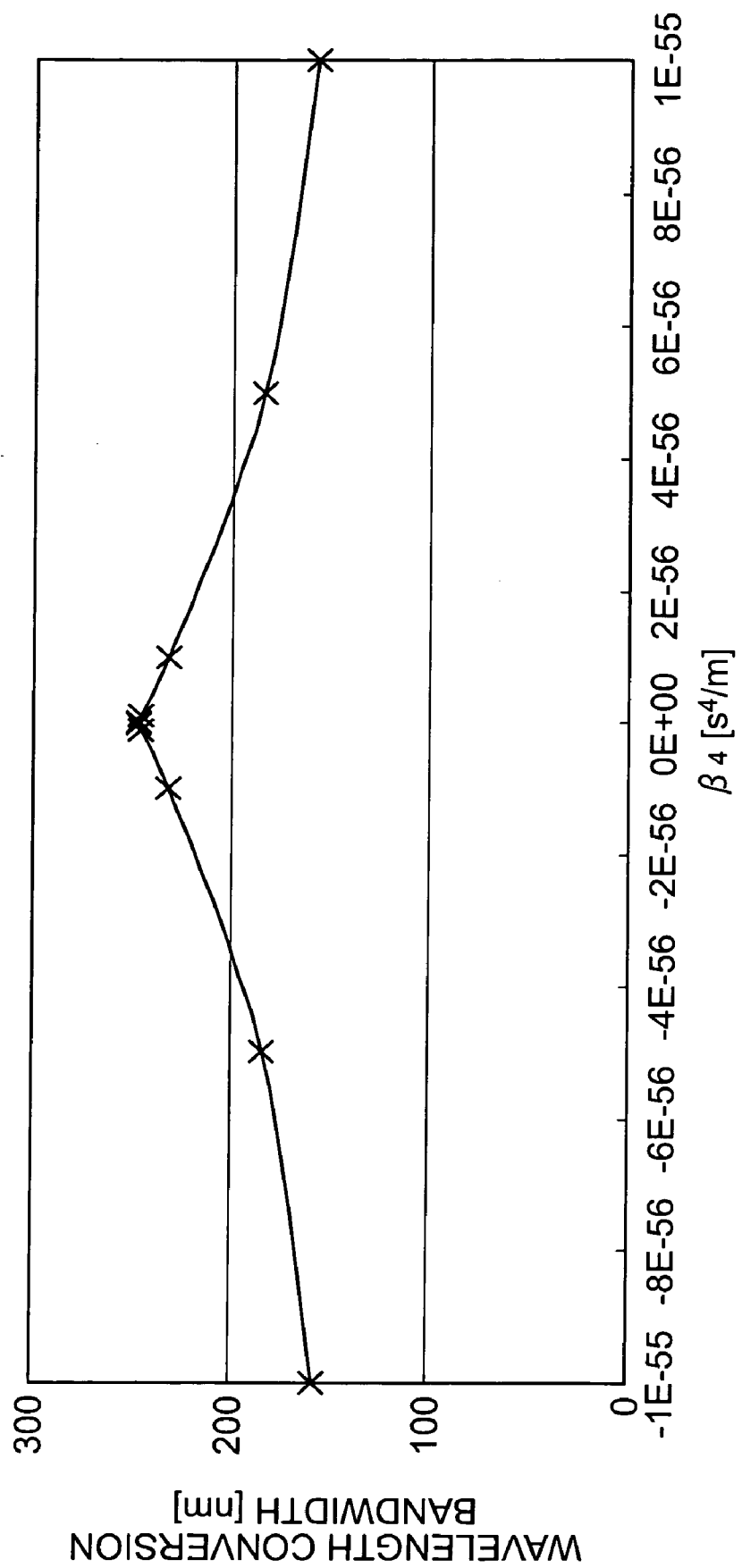
FIG. 8 is a drawing showing the relationship between the wavelength conversion bandwidth and the fourth order dispersion $\beta_4$ in an optical fiber with the fiber length of 100 m with variation of ±0.10 nm in the zero dispersion wavelength $\lambda_0$.

In fact, the zero dispersion wavelength $\lambda_0$ often varies in the range of about ±0.05 nm to ±0.10 nm. For example, in the fiber length of 100 m, the wavelength conversion bandwidth varies as shown in FIGS. 7 and 8. FIG. 7 is a drawing showing the relationship between the wavelength conversion bandwidth and the fourth order dispersion $\beta_4$ in the optical fiber with the fiber length of 100 m with variation of ±0.05 nm in the zero dispersion wavelength $\lambda_0$. This figure proves that when the absolute value of the fourth order dispersion $\beta_4$ is not more than $5 \times 10^{-56}$ s$^4$/m, the wavelength conversion bandwidth becomes characteristically large and not less than about 200 nm and that when the absolute value of the fourth order dispersion $\beta_4$ is not more than $1 \times 10^{-57}$ s$^4$/m, the wavelength conversion bandwidth becomes extremely wide, not less than about 300 nm. FIG. 8 is a drawing showing the relationship between the wavelength conversion bandwidth and the fourth order dispersion $\beta_4$ in the optical fiber with the fiber length of 100 m with variation of ±0.10 nm in the zero dispersion wavelength $\lambda_0$. As shown in this figure, when the absolute value of the fourth order dispersion $\beta_4$ is not more than $3 \times 10^{-56}$ s$^4$/m, the wavelength conversion bandwidth can be expanded to about 200 nm or more, which is preferred. More preferably, the absolute value of the fourth order dispersion $\beta_4$ is not more than $2 \times 10^{-56}$ s$^4$/m.

Figure 9:
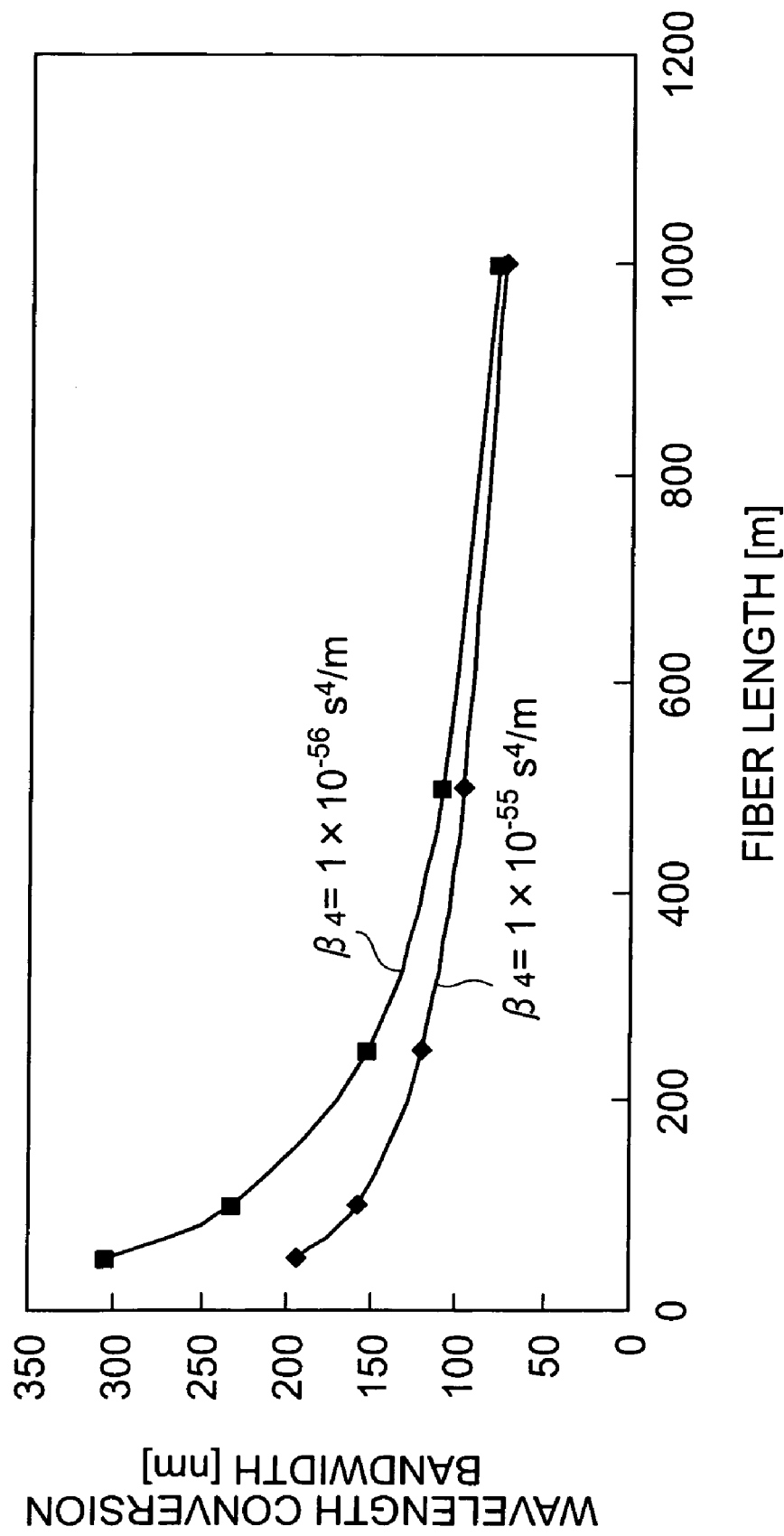
FIG. 9 is a drawing showing the relationship between the wavelength conversion bandwidth and the fiber length L in an optical fiber with variation of ±0.10 nm in the zero dispersion wavelength $\lambda_0$.
Figure 10:
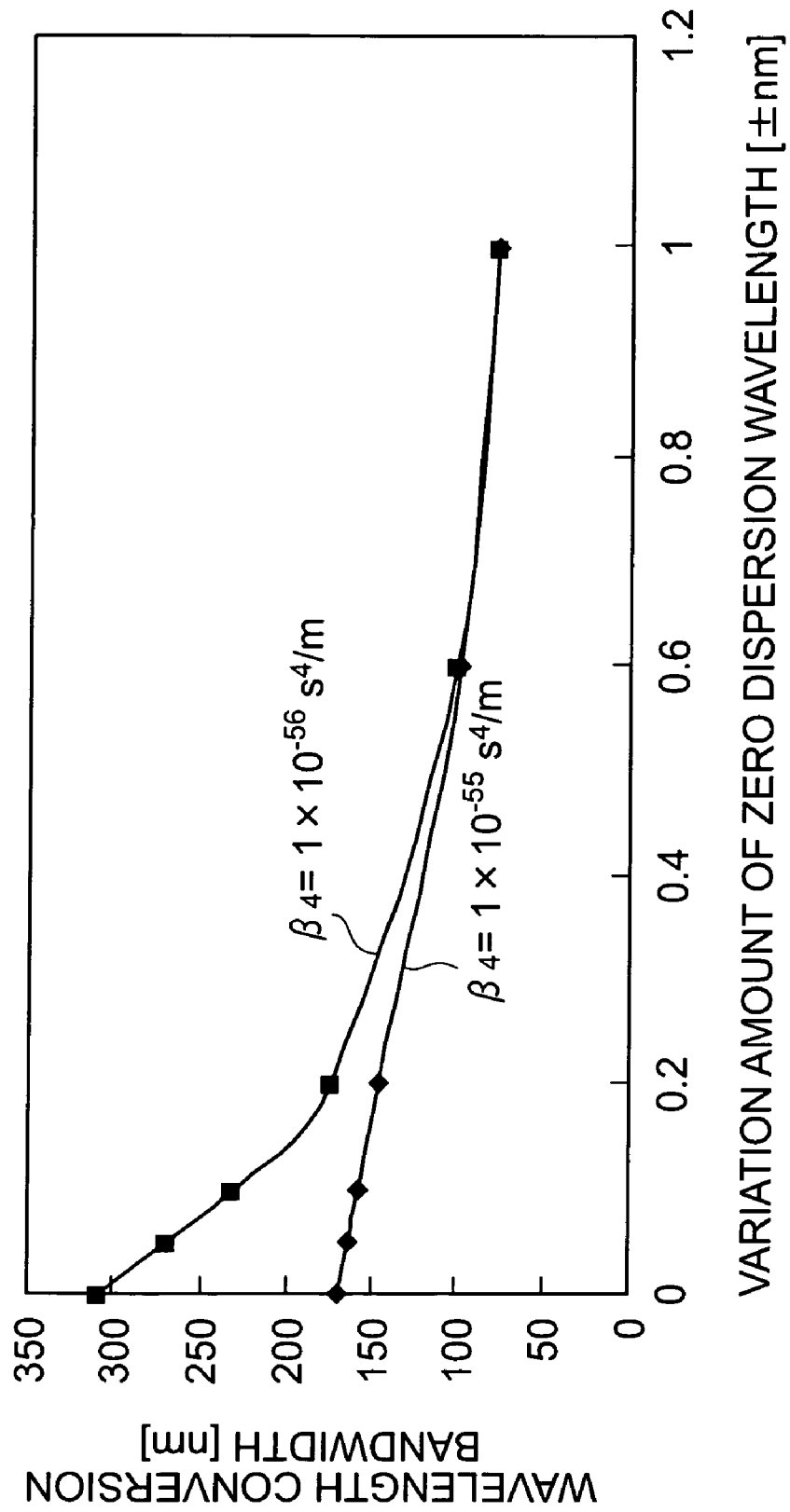
FIG. 10 is a drawing showing the relationship between the wavelength conversion bandwidth and variation amount of zero dispersion wavelength $\lambda_0$.

As seen from the aforementioned Eq (7), the longer the length L of optical fiber, the higher the power $P_{I\text{-}out}$ of the idler $\lambda_I$ emitted from the optical fiber, and the higher the efficiency. It is also seen from Eq (7) that this can be solved by increasing the power $P_P$ of the pump $\lambda_P$ injected into the optical fiber. It is apparent from FIGS. 4 and 5 that the wavelength conversion bandwidth is expanded with decrease in the length L of optical fiber. For example, with variation of about ±0.10 nm in the zero dispersion wavelength $\lambda_0$, the wavelength conversion bandwidth varies as shown in FIG. 9. FIG. 9 is a drawing showing the relationship between the wavelength conversion bandwidth and the fiber length L in the optical fiber with variation of ±0.10 nm in the zero dispersion wavelength $\lambda_0$. This figure proves that the effect of decrease of the fourth order dispersion $\beta_4$ becomes definite when the fiber length L is not more than 500 m. FIG. 10 is a drawing showing the relationship between the wavelength conversion bandwidth and variation amount of the zero dispersion wavelength $\lambda_0$. As seen from this figure, the wavelength conversion bandwidth becomes narrower with increasing variation in the zero dispersion wavelength $\lambda_0$. When the variation in the zero dispersion wavelength $\lambda_0$ is not less than ±0.6 nm, the effect of decrease of the fourth order dispersion $\beta_4$ becomes unclear.

By suppressing the variation in the zero dispersion wavelength $\lambda_0$ to not more than ±0.6 nm, it becomes feasible to achieve wavelength conversion in a wide band of not less than 100 nm. From FIGS. 4A-Ac, 5A-5C, and 10, when the variation in the zero dispersion wavelength $\lambda_0$ is not less than ±0.6 nm, the effect of decrease of the fourth order dispersion $\beta_4$ is not so significant, and when the variation in the zero dispersion wavelength $\lambda_0$ is not more than ±0.2 nm, the effect of decrease of the fourth order dispersion $\beta_4$ appears apparent to expand the bandwidth, which is further more preferred.

The following will describe specific configuration examples of optical fiber capable of reducing the absolute value of the fourth order dispersion $\beta_4$ as described above. No investigation has been conducted heretofore about the optical fiber capable of reducing the absolute value of the fourth order dispersion $\beta_4$, and the Inventor first conducted the research. As seen from Eq (7) above, the nonlinear coefficient $\gamma$ of optical fiber is preferably as high as possible and is particularly preferably not less than 10/W-km. For this reason, the effective area $A_{eff}$ of optical fiber is desirably not more than 15 µm².

Figure 11A:
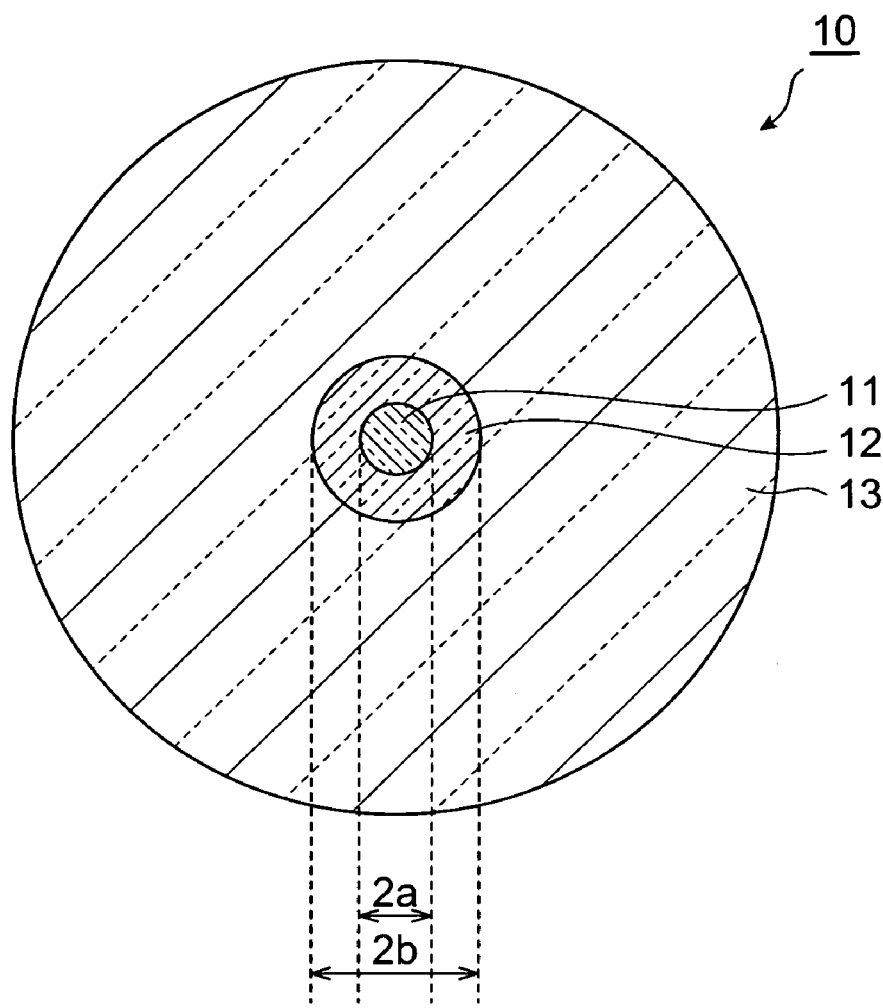
FIGS. 11A and 11B are drawings showing a preferred example of a sectional structure and index profile of optical fiber 10 according to an embodiment of the invention.
Figure 11B:
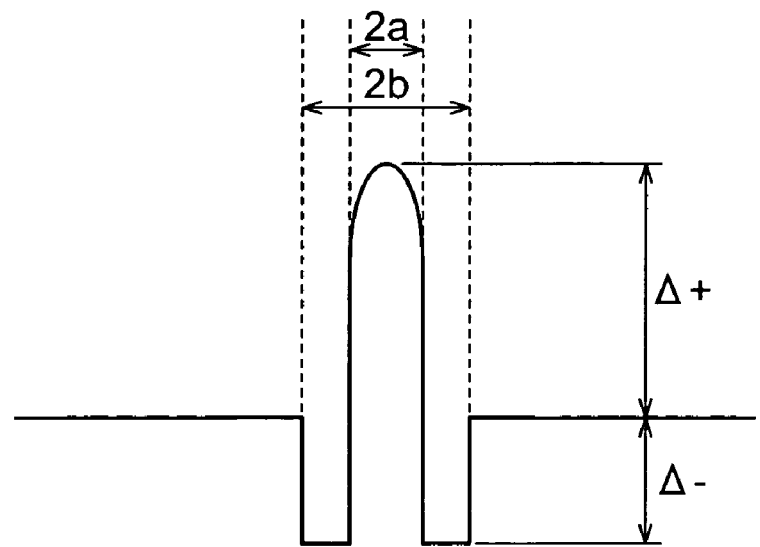

FIGS. 11A and 11B are drawings showing a preferred example of a sectional structure and index profile of optical fiber 10 according to the present embodiment. FIG. 11A shows a cross section normal to the longitudinal direction of optical fiber 10 and FIG. 11B shows the index profile in the radial direction of optical fiber 10. The optical fiber 10 comprises at least a center core part 11 having a maximum refractive index $N_1$ and outside diameter $2a$, a depressed part 12 surrounding this center core part 11 and having a minimum refractive index $N_2$ and outside diameter $2b$, and a cladding part 13 surrounding this depressed part 12 and having a maximum refractive index $N_3$.

The refractive indices of the center core part 11, depressed part 12, and cladding part 13 satisfy the relation of "$N_1>N_3>N_2$." With reference to the refractive index $N_3$ of the cladding part 13, the relative index difference of the center core part 11 is denoted by $\Delta_+$ and the relative index difference of the depressed part 12 by $\Delta_-$. A ratio of the respective outside diameters of the center core part 11 and the depressed part 12 is denoted by Ra ($=2a/2b$).

FIG. 12 is a drawing showing a table of the dispersion slope S, the wavelength derivative of the dispersion slope (dS/d$\lambda$), and the fourth order dispersion $\beta_4$, for each of values of the ratio Ra. In the optical fiber 10 of the structure shown in FIG. 11, the parameters used are as follows: the $\alpha$ value in the alpha profile of refractive index of the center core part 11 is 3, the relative index difference $\Delta_+$ of the center core part 11 3.2%, the relative index difference $\Delta_-$ of the depressed part 12 −0.3%, and the zero dispersion wavelength $\lambda_0$ 1550 nm.

As seen from this figure, the fourth order dispersion $\beta_4$ is dependent on Ra, the absolute value of the fourth order dispersion $\beta_4$ is not more than $5\times10^{-56}$ s⁴/m with Ra being not less than 0.4, and the absolute value of the fourth order dispersion $\beta_4$ is not more than $1\times10^{-56}$ s⁴/m, particularly, with Ra being near 0.6. Other characteristics of this optical fiber 10 are as follows: at the wavelength of 1550 nm, the effective area $A_{eff}$ is 9.8 µm², the nonlinear coefficient $\gamma$ 24/W-km (measured by XPM method), the fiber cutoff wavelength 1400 nm, the transmission loss 0.6 dB/km, the mode field diameter 3.6 µm, and the polarization mode dispersion 0.01-0.1 ps/km$^{1/2}$. It is known that a measured value of the nonlinear coefficient $\gamma$ by CW-SPM method is as small as approximately 70% of the measured value of the nonlinear coefficient $\gamma$ by XPM method.

This optical fiber 10 is very resistant to bending and, even when wound in the diameter of 30$\phi$, an increase of loss is not more than 0.01 dB/km. This optical fiber 10 can be spliced with an ordinary single-mode optical fiber, with a splice loss of about 0.5 dB by use of a popular splicer, and the splice loss can be reduced to 0.2 dB or less by use of a method of expanding the mode field diameter.

FIG. 13 is also a drawing showing a table of the dispersion slope S, the wavelength derivative of the dispersion slope (dS/d$\lambda$), and the fourth order dispersion $\beta_4$, for each of values of the ratio Ra. In the optical fiber 10 of the structure as shown in FIGS. 11A and 11B, the parameters used herein are as follows: the a value in the alpha profile of refractive index of the center core part 11 is 3, the relative index difference $\Delta_+$ of the center core part 11 3.5%, the relative index difference $\Delta_-$ of the depressed part 12 −0.35%, and the zero dispersion wavelength $\lambda_0$ 1540 nm.

As seen from this figure, this optical fiber 10 generally has the small fourth order dispersion $\beta_4$ and signs thereof change near each ratio Ra of 0.45 and 0.75. This means that when the optical fiber 10 is fabricated with the ratio Ra near either of these values, it is feasible to substantialize the optical fiber 10 with the extremely small fourth order dispersion $\beta_4$ of not more than $5\times10^{-57}$ s⁴/m. The other characteristics of this optical fiber 10 are as follows: at the wavelength of 1550 nm, the effective area $A_{eff}$ is 9.1 µm², the nonlinear coefficient $\gamma$ 26/W-km (measured by XPM method), the fiber cutoff wavelength is 1450 nm, the transmission loss is 0.9 dB/km, the mode field diameter is 3.4 µm, and the polarization mode dispersion is 0.01-0.1 ps/km$^{1/2}$.

This optical fiber 10 is also very resistant to bending and, even when wound in the diameter of 30$\phi$, an increase of loss is not more than 0.01 dB/km. This optical fiber 10 can also be spliced with an ordinary single-mode optical fiber, with a splice loss of about 0.5 dB by use of a popular splicer, and the splice loss can be reduced to 0.2 dB or less by use of a method of expanding the mode field diameter.

Figure 14A:
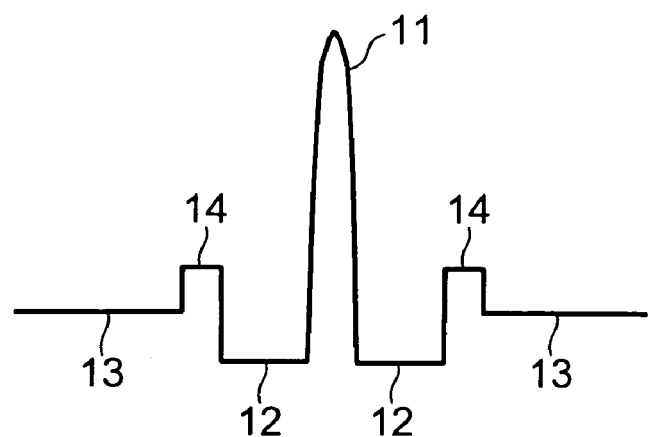
FIGS. 14A, 14B, 14C and 14D are drawings showing other preferred examples of the index profile of optical fiber according to an embodiment of the invention.
Figure 14B:
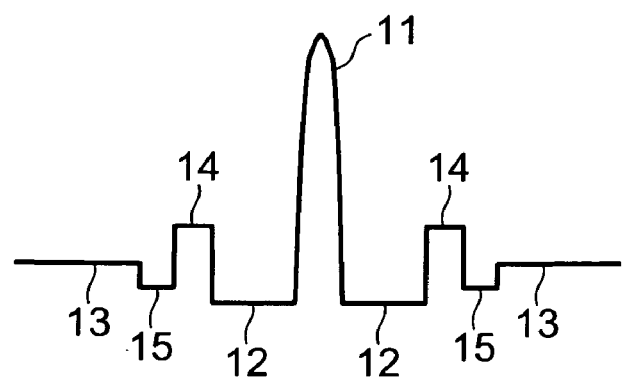
Figure 14C:
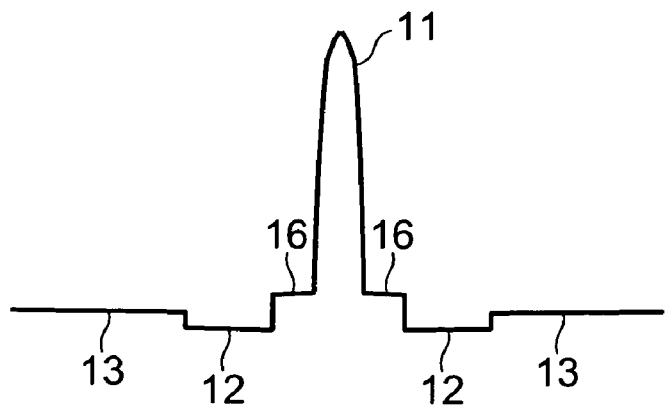
Figure 14D:
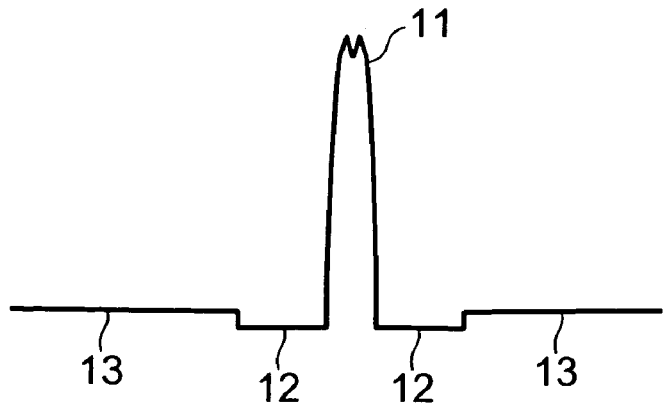

As described above, the fourth order dispersion $\beta_4$ can be adjusted in the optical fiber of the structure having the center core part 11 and the depressed part 12. FIGS. 14A-14D are drawings showing other preferred examples of the index profile of optical fiber according to the present embodiment. As shown in FIG. 14A, the optical fiber may have still another region 14 outside the depressed part 11; as shown in FIG. 14B, the optical fiber may have still another region 15 outside the region 14; as shown in FIG. 14C, the optical fiber may have another region 16 between the center core part 11 and the depressed part 12; as shown in FIG. 14D, a dip may exist in the center core part 11. In any of these cases, the fourth order dispersion $\beta_4$ can be adjusted, so that the absolute value of the fourth order dispersion $\beta_4$ can be made smaller.

The polarization mode dispersion is preferably as small as possible because the wavelength conversion bandwidth becomes wider by that degree. The polarization mode dispersion at the overall length of optical fiber is preferably not more than 0.2 ps. When the optical fiber is of a polarization maintaining type (e.g., the PANDA type), it is feasible to suppress coupling between orthogonal polarization components of fundamental mode light guided through the optical fiber, and it is more preferred. The coupling between orthogonal polarization components can be made not more than −15 dB even in the fiber length of 1 km, and can be further reduced in practically used fiber lengths.

The optical fiber may be wound, for example, in a small coil with the minimum bend diameter of about 40$\phi$. At this time, the coil can be made smaller as the covering outside diameter of optical fiber becomes thinner, not more than 150 µm. When the outside diameter of the glass part 11 of optical fiber is thin, not more than 100 µm, winding stress is small in a compact winding state to reduce a probability of breakage and it becomes feasible to suppress deterioration of the polarization mode dispersion due to bend-induced birefringence.

Optical fibers satisfying the characteristics as described above were fabricated actually. All the optical fibers had the structure as shown in FIG. 11. An optical fiber fabricated had the following values of the respective parameters: the α value in the alpha profile of refractive index of the center core part 11 was 3, the relative index difference $\Delta_+$ of the center core part 11 was 2.5%, the relative index difference $\Delta_-$ of the depressed part was 12 −0.5%, the ratio Ra was 0.6, and the core diameter 2a was 4.7 µm. This optical fiber had the zero dispersion wavelength of 1440 nm. The optical fiber was a highly nonlinear optical fiber with the fourth order dispersion $\beta_4$ reduced and with the following characteristics: at the zero dispersion wavelength of 1440 nm, the dispersion slope was +0.0466 ps/nm²/km, the wavelength derivative of the dispersion slope was $1.66 \times 10^{-4}$ ps/nm³/km, the fourth order dispersion $\beta_4$ was $-3.8 \times 10^{-56}$ s⁴/m, the effective area $A_{eff}$ was 11 µm², the nonlinear coefficient γ was 21/W-km, the mode field diameter was 3.8 µm, the cutoff wavelength was 1.37 µm, and the polarization mode dispersion in the C-band was 0.02 ps/km$^{1/2}$.

Another optical fiber produced had the following values of the respective parameters: the α value in the alpha profile of refractive index of the center core part 11 was 1.9, the relative index difference $\Delta_+$ of the center core part 11 was 3.0%, the relative index difference $\Delta_-$ of the depressed part 12 was −0.6%, the ratio Ra was 0.6, and the core diameter 2a was 4.5 µm. This optical fiber had the zero dispersion wavelength of 1640 nm. This optical fiber was a highly nonlinear optical fiber with the fourth order dispersion $\beta_4$ reduced and with the following characteristics: at the zero dispersion wavelength of 1640 nm, the dispersion slope was +0.0231 ps/nm²/km, the wavelength derivative of the dispersion slope was $-9.63 \times 10^{-5}$ ps/nm³/km, the fourth order dispersion $\beta_4$ was $-3.4 \times 10^{-56}$ s⁴/m, the effective area $A_{eff}$ was 11 µm², the nonlinear coefficient γ was 18/W-km, the mode field diameter was 3.9 µm, the cutoff wavelength was 1.31 µm, and the polarization mode dispersion in the C-band and L-band was 0.03 ps/km$^{1/2}$.

The following will descrilightore general design example of optical fiber capable of reducing the absolute value of the fourth order dispersion $\beta_4$ as described above. The optical fiber herein was also one having the structure as shown in FIG. 11, and having the following values of the respective parameters: the α value in the alpha profile of refractive index of the center core part 11 was 4 and the zero dispersion wavelength was 1550 nm.

FIG. 15 is a drawing showing a table of the dispersion slope S, the wavelength derivative of the dispersion slope (dS/dλ), and the fourth order dispersion $\beta_4$, for each of values of the ratio Ra, where the relative index difference $\Delta_+$ of the center core part 11 is 2.5% and the relative index difference $\Delta_-$ of the depressed part 12 is −0.1%. In this case, the absolute value of the fourth order dispersion $\beta_4$ is as large as about $7 \times 10^{-56}$ s⁴/m, and this is not a preferred example. The core diameter 2a is about 4 µm, the cutoff wavelength about 1400 nm, the effective area $A_{eff}$ at the wavelength of 1.55 µm is approximately 12 µm², and the nonlinear coefficient γ is about 17/W-km.

FIG. 16 is a drawing showing a table of the dispersion slope S, the wavelength derivative of the dispersion slope (dS/dλ), and the fourth order dispersion $\beta_4$, for each of values of the ratio Ra, where the relative index difference $\Delta_+$ of the center core part 11 is 2.5% and the relative index difference $\Delta_-$ of the depressed part 12 is −0.2%. In this case, the absolute value of the fourth order dispersion $\beta_4$ is as large as about $4 \times 10^{-56}$ s⁴/m and this is preferable. The core diameter 2a is about 4 µm, the cutoff wavelength is about 1400 nm, the effective area $A_{eff}$ at the wavelength of 1.55 µm is about 12 µm², and the nonlinear coefficient γ is about 18/W-km.

Figure 18:
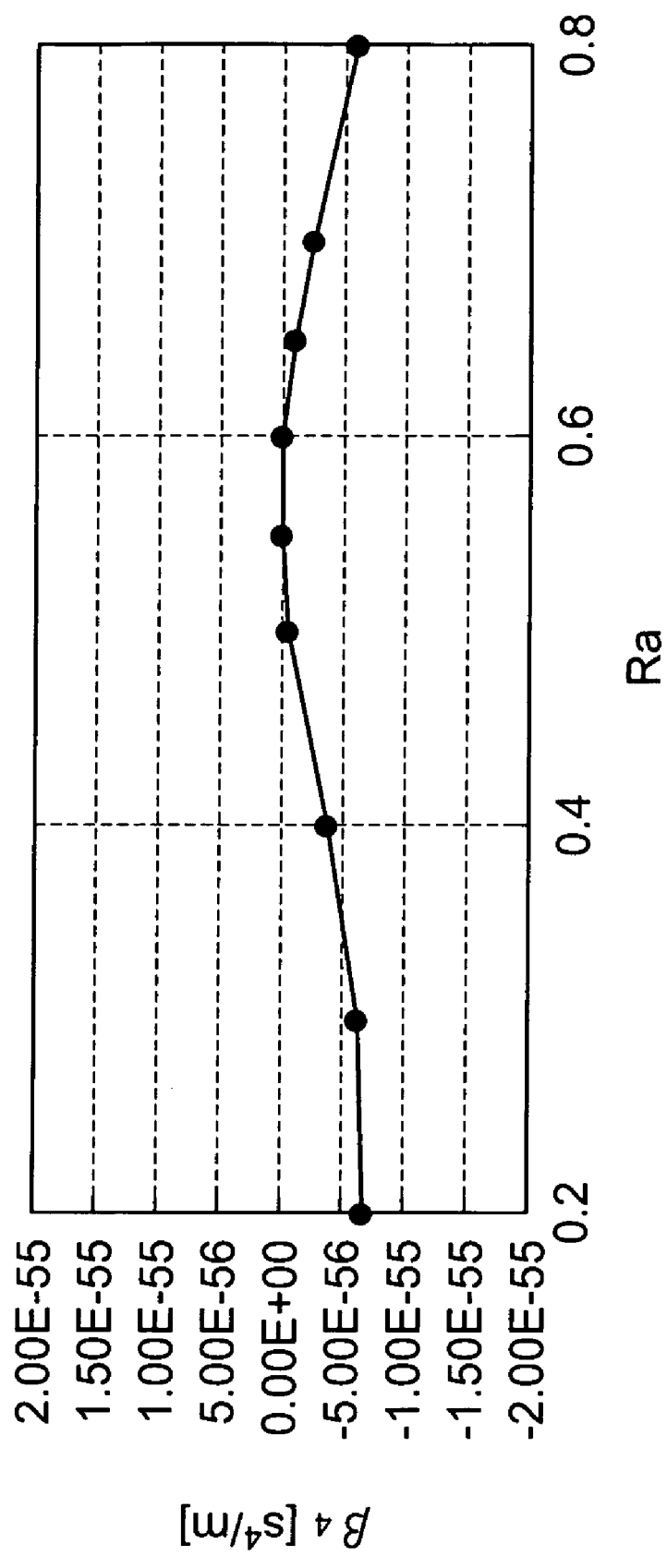
FIG. 18 is a drawing showing the relationship between the fourth order dispersion $\beta_4$ and the ratio Ra.

FIG. 17 is a drawing showing a table of the dispersion slope S, the wavelength derivative of the dispersion slope (dS/dλ), and the fourth order dispersion $\beta_4$, for each of values of the ratio Ra, where the relative index difference $\Delta_+$ of the center core part 11 is 2.5% and the relative index difference $\Delta_-$ of the depressed part 12 −0.3%. FIG. 18 is a drawing showing the relationship between the fourth order dispersion $\beta_4$ and the ratio Ra in this example. In this case, the absolute value of the fourth order dispersion $\beta_4$ can take the value of 0 and this is a preferred example. In addition, in the range of the ratio Ra of about 0.5 to about 0.65, the absolute value of the fourth order dispersion $\beta_4$ becomes not more than $1 \times 10^{-56}$ s⁴/m, and thus structure tolerances are wide in the fabrication of fiber, which is very preferred. The core diameter 2a is about 4 µm, the cutoff wavelength is about 1400 nm, the effective area $A_{eff}$ at the wavelength of 1.55 µm is about 12 µm², and the nonlinear coefficient γ about is 18/W-km.

Figure 20:
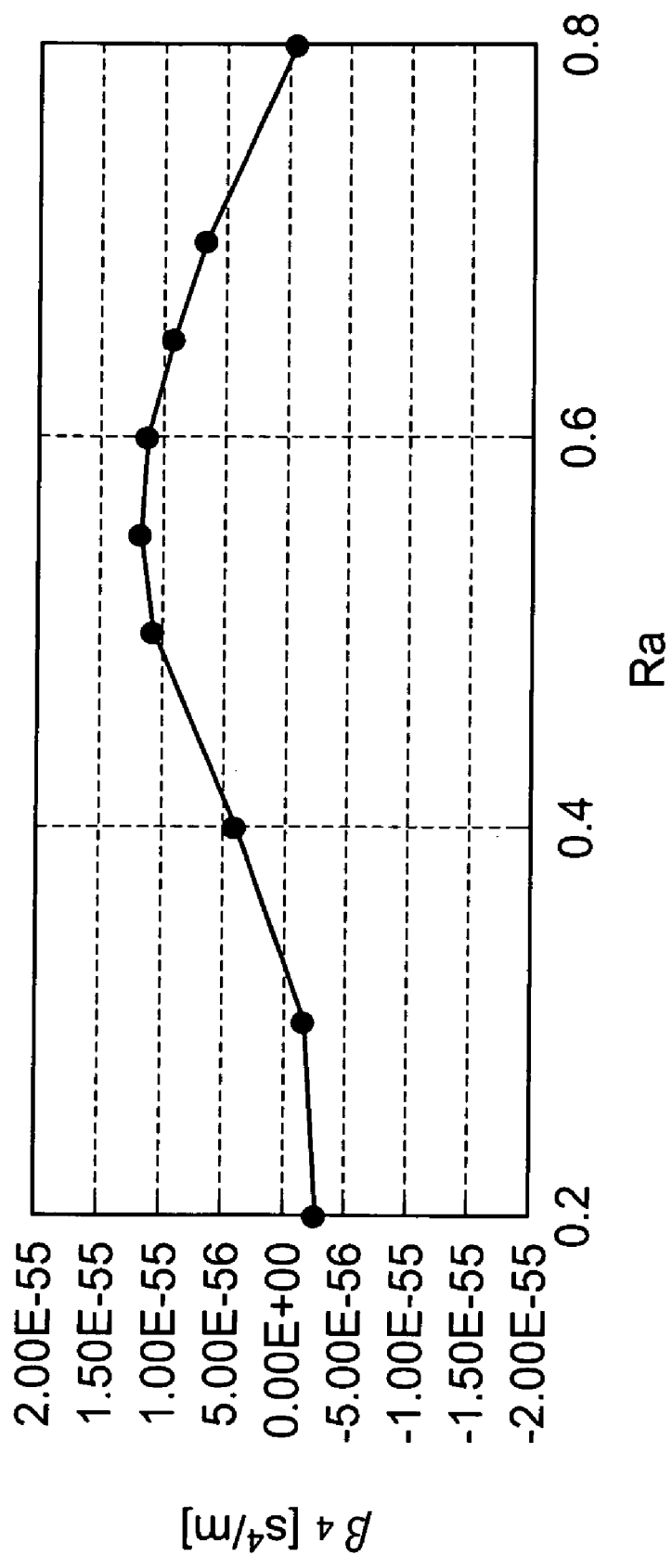
FIG. 20 is a drawing showing the relationship between the fourth order dispersion $\beta_4$ and the ratio Ra.

FIG. 19 is a drawing showing a table of the dispersion slope S, the wavelength derivative of the dispersion slope (dS/dλ), and the fourth order dispersion $\beta_4$, for each of values of the ratio Ra, where the relative index difference $\Delta_+$ of the center core part 11 is 2.5% and the relative index difference $\Delta_-$ of the depressed part 12 is −0.6%. FIG. 20 is a drawing showing the relationship between the fourth order dispersion $\beta_4$ and the ratio Ra in this example. In this case, the absolute value of the fourth order dispersion $\beta_4$ can take the value of 0 and this is a preferred example. However, when the fourth order dispersion $\beta_4$ is small near 0, the fourth order dispersion $\beta_4$ largely varies even with small variation in the ratio Ra, and thus structure tolerances are not so high in the fabrication of fiber. The core diameter 2a is about 4 µm, the cutoff wavelength is about 1300 nm, the effective area $A_{eff}$ at the wavelength of 1.55 µm is about 11 µm², and the nonlinear coefficient γ is about 20/W-km.

The following will describe the relationship between the fourth order dispersion $\beta_4$ and the ratio Ra with change in the relative index difference $\Delta_-$ of the depressed part 12.

Figure 21:
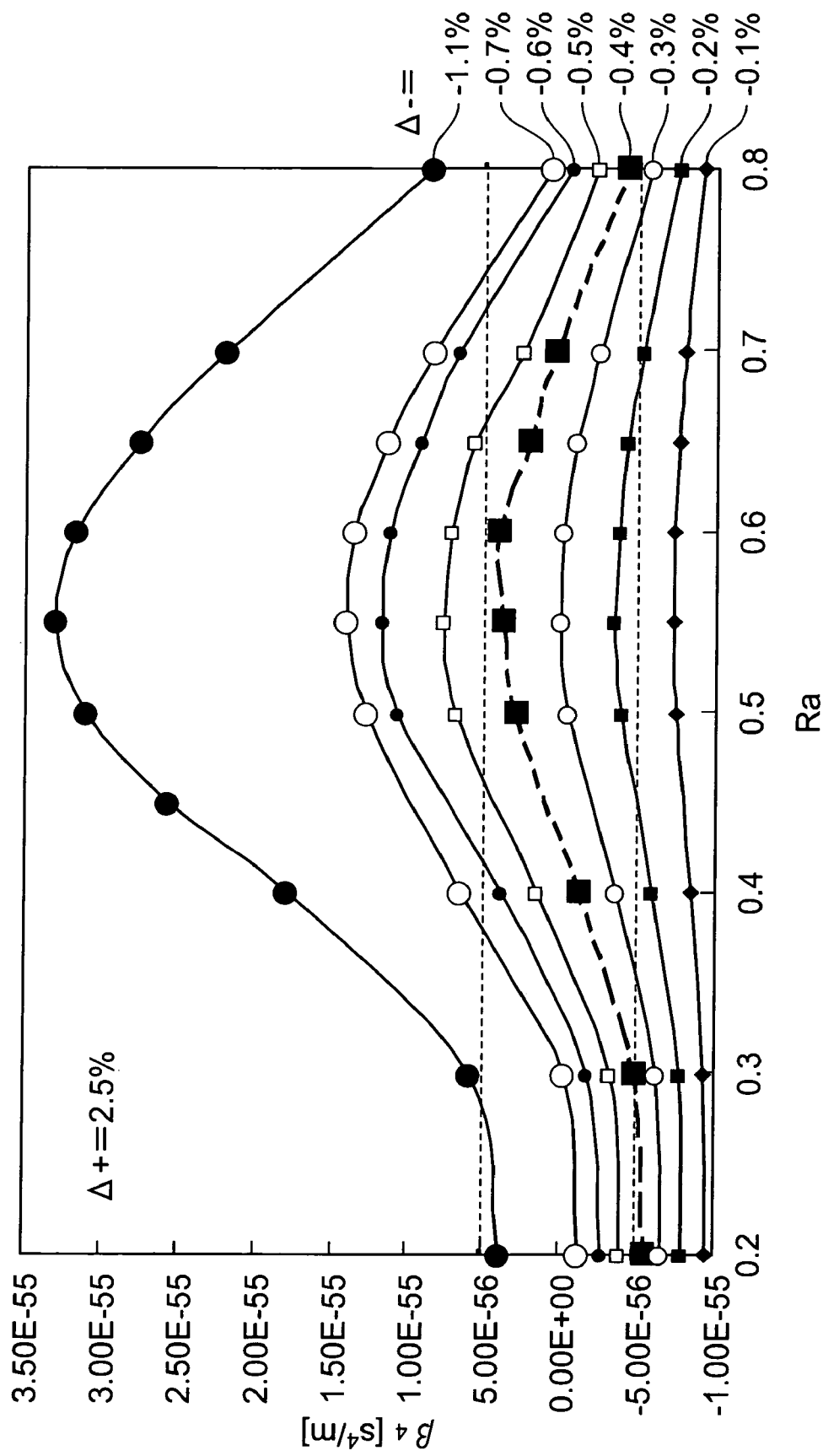
FIG. 21 is a drawing showing the relationship between the fourth order dispersion $\beta_4$ and the ratio Ra.

FIG. 21 is a drawing showing the relationship between the fourth order dispersion $\beta_4$ and the ratio Ra, where the relative index difference $\Delta_+$ of the center core part 11 is 2.5%. Here is the relationship between the fourth order dispersion $\beta_4$ and the ratio Ra, for each of values of the relative index difference $\Delta_-$ of the depressed part 12. When $\Delta_+$ is 2.5%, if $\Delta_-$ is not more than about −0.2% and if the difference "$\Delta_+ - \Delta_-$" is not less than about 2.7%, the absolute value of the fourth order dispersion $\beta_4$ becomes not more than $5 \times 10^{-56}$ s⁴/m. It is seen that the fourth order dispersion $\beta_4$ takes a minimum near the ratio Ra of 0.5-0.6. When the absolute value of the fourth order dispersion $\beta_4$ is small near this range, the fabrication tolerances become high and with $\Delta_-$ of −0.4% to −0.2% the fabrication is easy. Even in the cases where $\Delta_-$ is −0.5% to −1.1% and the ratio Ra 0.2-0.3, the absolute value of the fourth order dispersion $\beta_4$ is always small and the fabrication is easy.

Figure 22:
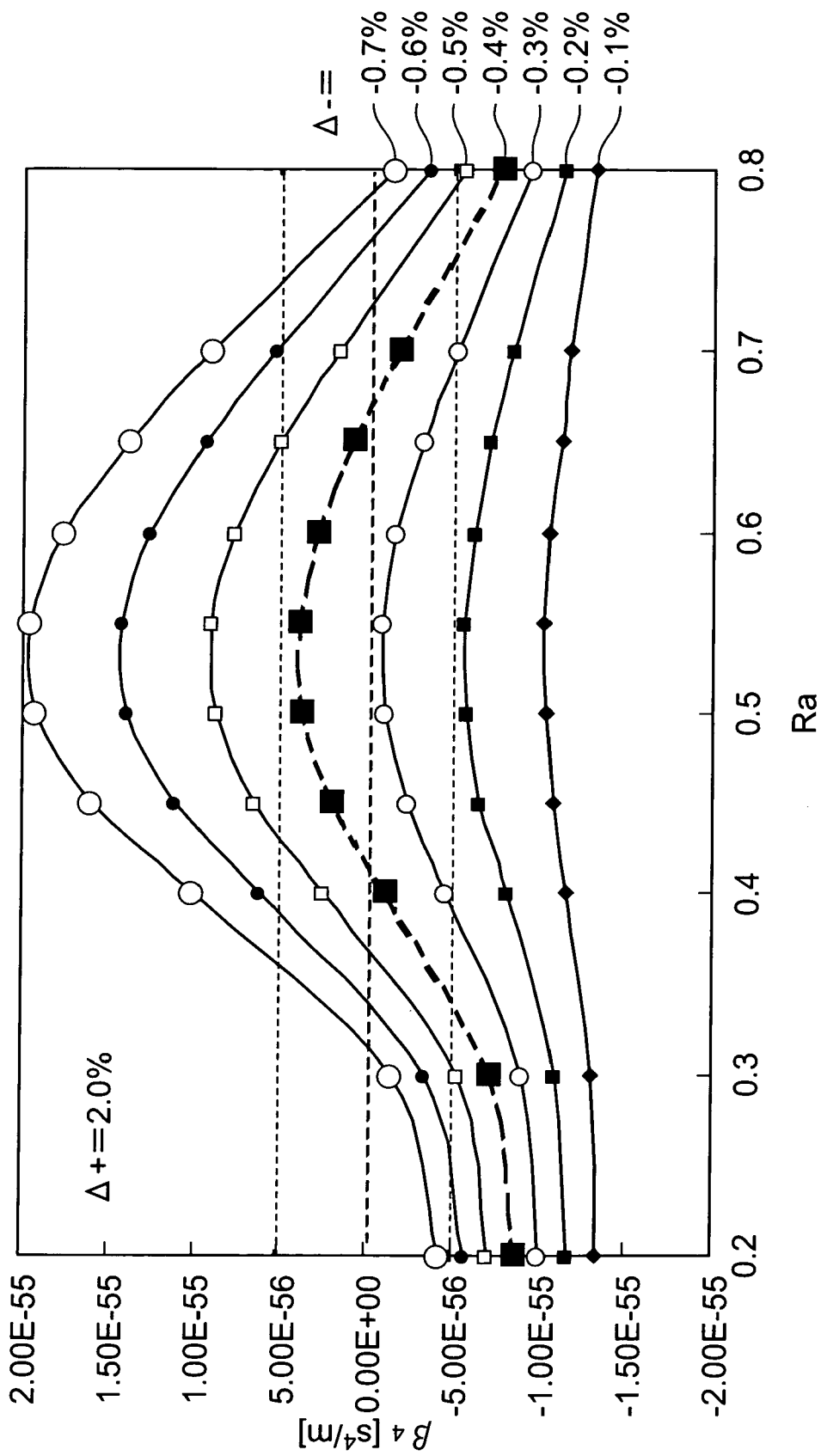
FIG. 22 is a drawing showing the relationship between the fourth order dispersion $\beta_4$ and the ratio Ra.

FIG. 22 is a drawing showing the relationship between the fourth order dispersion $\beta_4$ and the ratio Ra, where the relative index difference $\Delta_+$ of the center core part 11 is 2.0%. Here is also the relationship between the fourth order dispersion $\beta_4$ and the ratio Ra for each of values of the relative index difference $\Delta_-$ of the depressed part 12. The other characteristics are as follows: the core diameter 2a is about 4.5 µm, the effective area $A_{eff}$ at the wavelength of 1.55 µm is about 13-15 µm², the nonlinear coefficient γ is 13-15/W-km, and the cutoff wavelength is about 1200-1300 nm. When $\Delta_+$ is 2.0%, if $\Delta_-$ is not more than about −0.2% and if the difference "$\Delta_+ - \Delta_-$" is not less than about 2.2%, the absolute value of the fourth order dispersion $\beta_4$ becomes not more than $5 \times 10^{-56}$ s$^4$/m. It is seen that the fourth order dispersion $\beta_4$ takes a minimum near the ratio Ra of 0.4-0.6. When the absolute value of the fourth order dispersion $\beta_4$ is small near this range, the fabrication tolerances become high and the fabrication is easy if $\Delta_-$ is −0.4 to −0.25%. Even in the cases where $\Delta_-$ is not more than −0.5% and the ratio is between Ra 0.2 and 0.3, the absolute value of the fourth order dispersion $\beta_4$ is always small and the fabrication is easy.

Figure 23:
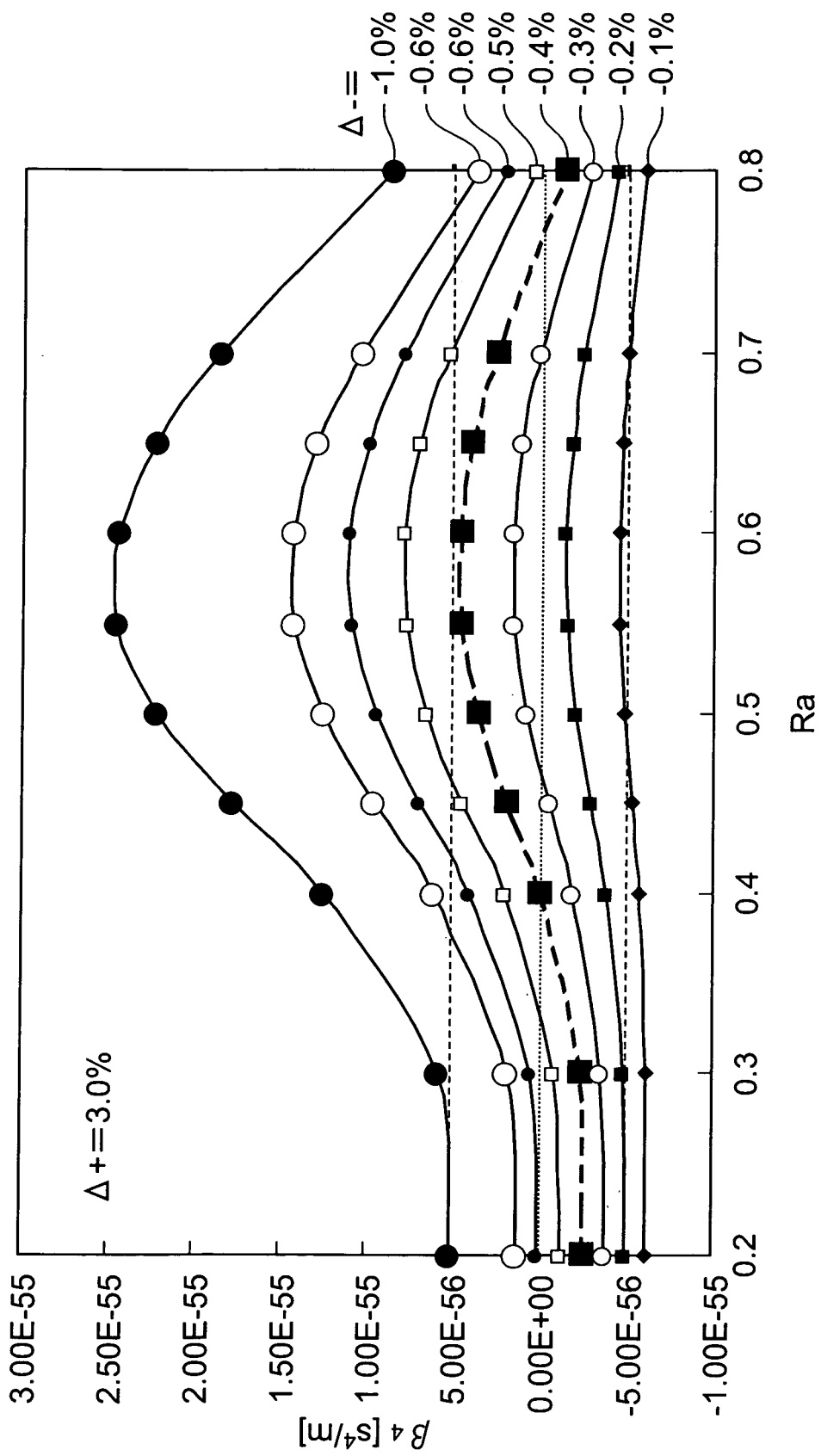
FIG. 23 is a drawing showing the relationship between the fourth order dispersion $\beta_4$ and the ratio Ra.

FIG. 23 is a drawing showing the relationship between the fourth order dispersion $\beta_4$ and the ratio Ra, where the relative index difference $\Delta_+$ of the center core part 11 is 3.0%. Here is also the relationship between the fourth order dispersion $\Delta_4$ and the ratio Ra for each of values of the relative index difference $\Delta_-$ of the depressed part 12. The other characteristics are as follows: the core diameter 2a is about 4.0 μm, the effective area A$_{eff}$ at the wavelength of 1.55 μm is about 9-10 μm$^2$, the nonlinear coefficient γ is 22-26/W-km, and the cutoff wavelength is about 1500-1300 nm. When $\Delta_+$ is 3.0%, if $\Delta_-$ is not more than about −0.10% and if the difference "$\Delta_+ - \Delta_-$" is not less than about 3.1%, the absolute value of the fourth order dispersion $\beta_4$ becomes not more than $5 \times 10^{-56}$ s$^4$/m. It is seen that the fourth order dispersion $\beta_4$ takes a minimum near the ratio Ra of 0.4-0.6. When the absolute value of the fourth order dispersion $\beta_4$ is small near this range, the fabrication tolerances become high and the fabrication is easy if $\Delta_-$ is −0.4 to −0.15%. Even in the cases where $\Delta_-$ is −1.0% to −0.2% and the ratio Ra is between 0.2 and 0.3, the absolute value of the fourth order dispersion $\beta_4$ is always small and the fabrication is easy.

Figure 24:
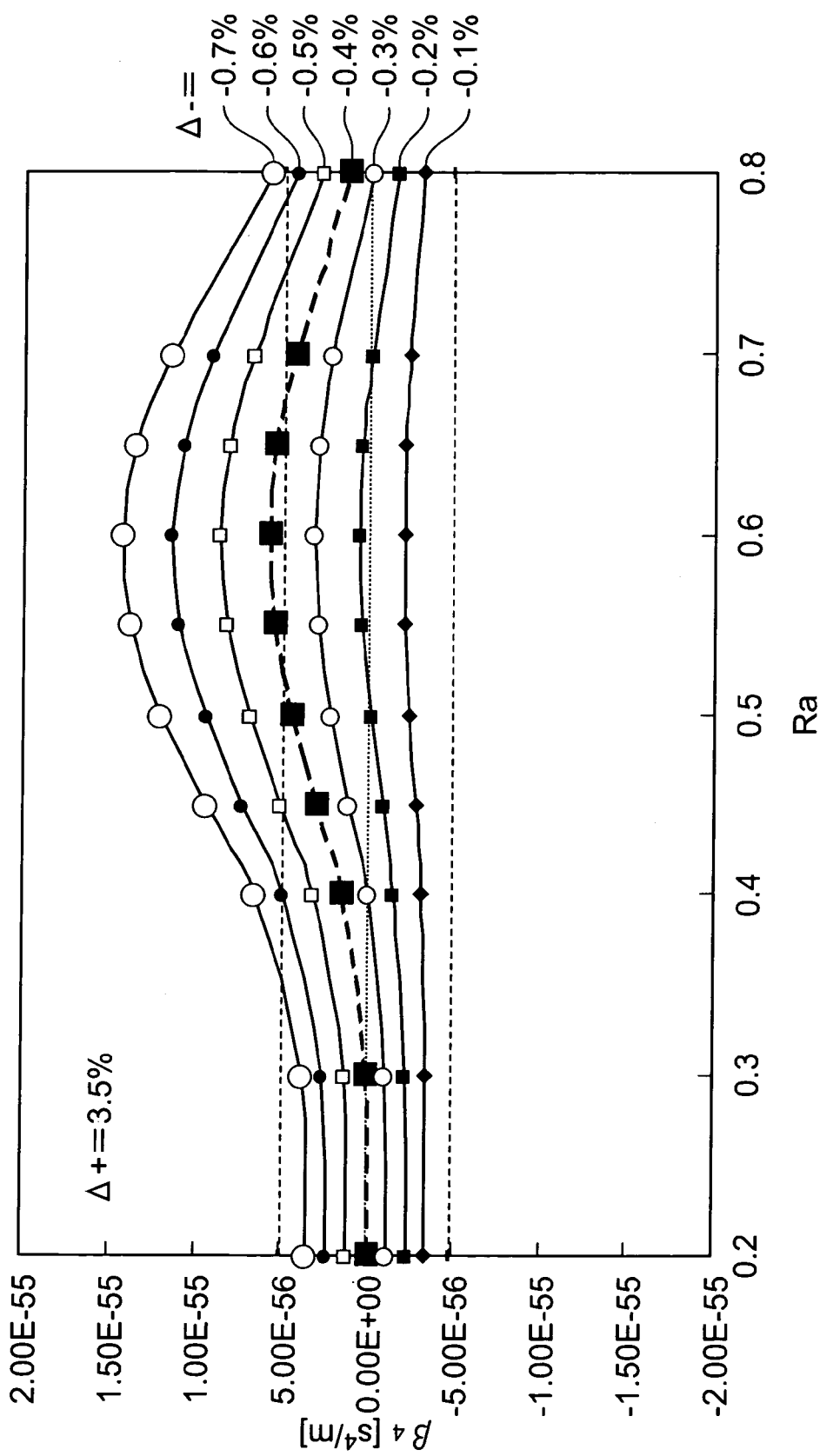
FIG. 24 is a drawing showing the relationship between the fourth order dispersion $\beta_4$ and the ratio Ra.

FIG. 24 is a drawing showing the relationship between the fourth order dispersion $\beta_4$ and the ratio Ra, where the relative index difference $\Delta_+$ of the center core part 11 is 3.5%. Here is also the relationship between the fourth order dispersion $\beta_4$ and the ratio Ra for each of values of the relative index difference $\Delta_-$ of the depressed part 12. The other characteristics are as follows: the core diameter 2a is about 4.0 μm, the effective area A$_{eff}$ at the wavelength of 1.55 μm is about 8-9 μm$^2$, the nonlinear coefficient γ is 28-31/W-km, and the cutoff wavelength is about 1600-1400 nm. When $\Delta_+$ is 3.5%, if $\Delta_-$ is not more than about −0.10% and if the difference "$\Delta_+ - \Delta_-$" is not less than about 3.6%, the absolute value of the fourth order dispersion $\beta_4$ becomes not more than $5 \times 10^{-56}$ s$^4$/m. It is seen that the fourth order dispersion $\beta_4$ takes a minimum near the ratio Ra of 0.4-0.7. When the absolute value of the fourth order dispersion $\beta_4$ is small near this range, the fabrication tolerances become high and the fabrication is easy if $\Delta_-$ is −0.3 to −0.1%. Even in the cases where $\Delta_-$ is −0.7% to −0.1% and the ratio Ra is between 0.2 and 0.4, the absolute value of the fourth order dispersion $\beta_4$ is always small and the fabrication is easy.

The above is summarized as follows: preferably, the difference "$\Delta_+ - \Delta_-$" between the relative index difference $\Delta_+$ of the center core part 11 and the relative index difference $\Delta_-$ of the depressed part 12 is not less than 2.2%, the relative index difference $\Delta_-$ of the depressed part 12 is −0.1 to −1.1%, and the ratio Ra is 0.2-0.7. More preferably, the difference "$\Delta_+ - \Delta_-$" is not less than 3.1%, $\Delta_-$ is −0.1 to −1.1%, and the ratio Ra is 0.2-0.7 because the effective area A$_{eff}$ becomes small, not more than 11 μm$^2$, and the nonlinear coefficient γ becomes large, not less than about 20/W-km.

Figure 25:
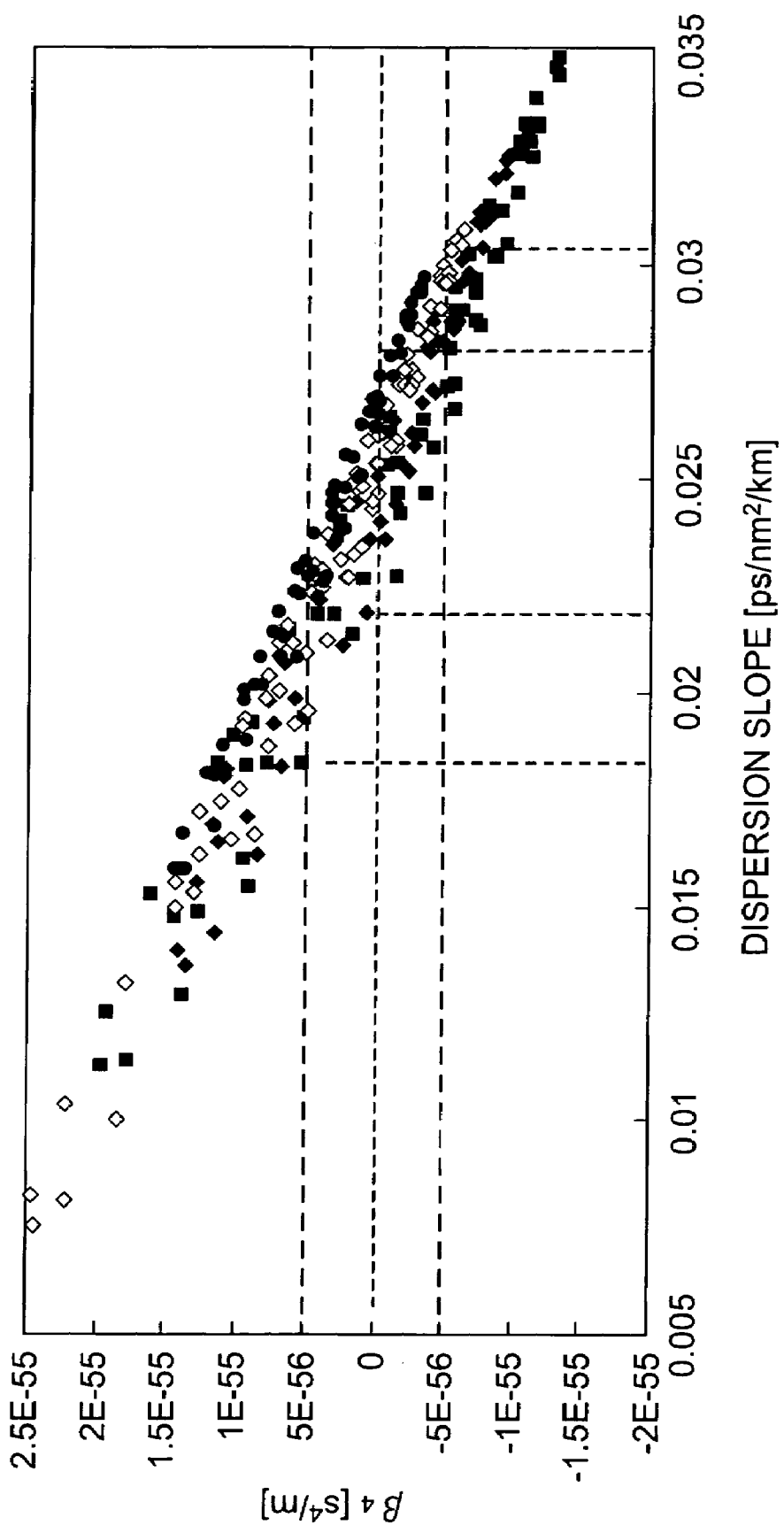
FIG. 25 is a drawing showing the relationship between the fourth order dispersion $\beta_4$ and the dispersion slope S.
Figure 26:
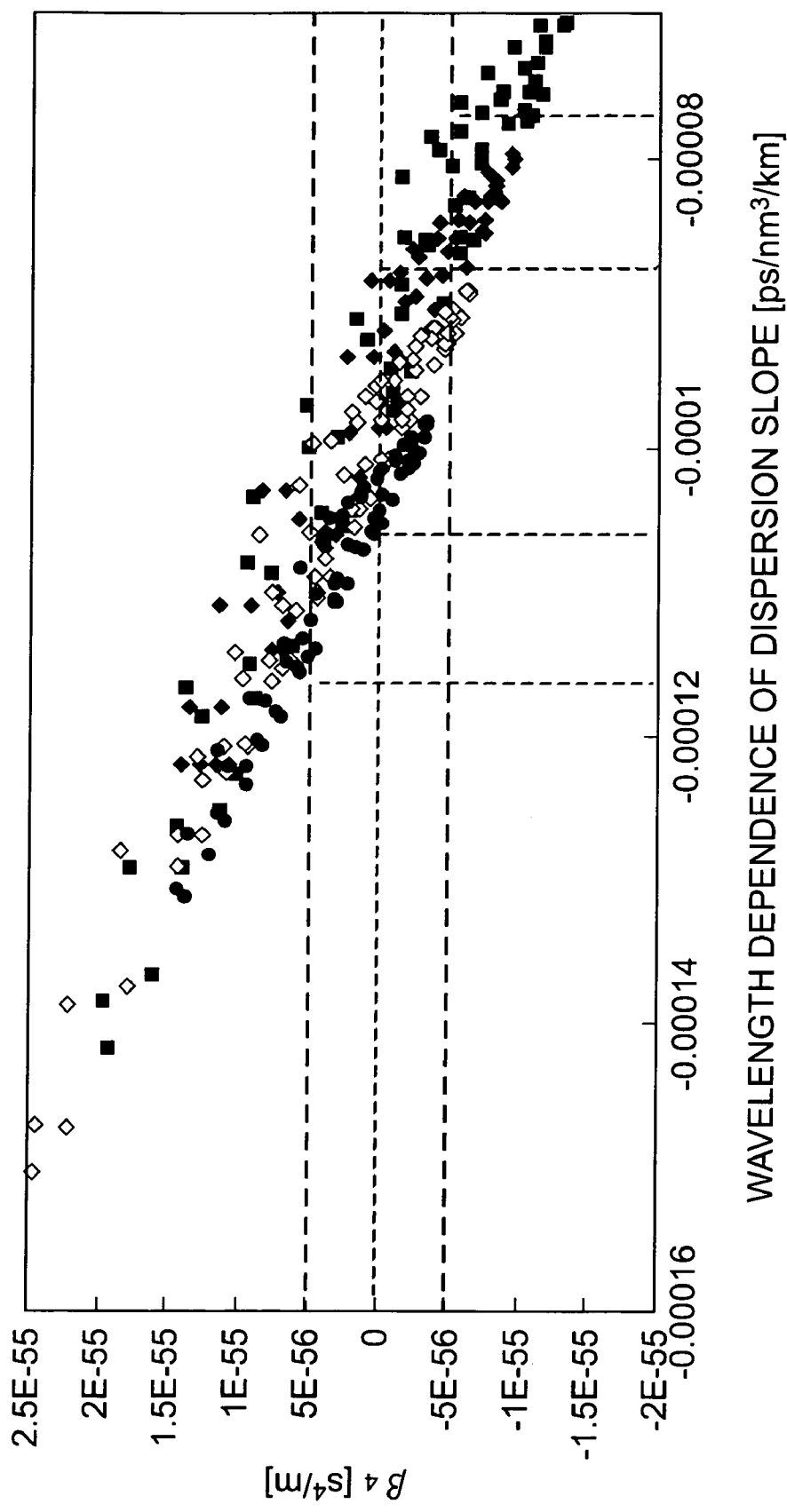
FIG. 26 is a drawing showing the relationship between the fourth order dispersion $\beta_4$ and the wavelength derivative of the dispersion slope S (dS/d$\lambda$).

From the above calculation results, the relationship between the fourth order dispersion $\beta_4$ and the dispersion slope S is illustrated as shown in FIG. 25, and the relationship between the fourth order dispersion $\beta_4$ and the wavelength derivative of the dispersion slope S (dS/dλ) is illustrated as shown in FIG. 26. As seen from FIG. 25, the dispersion slope S is preferably about +0.018 to +0.030 ps/nm$^2$/km. Furthermore, the dispersion slope S is more preferably about +0.022 to +0.028 ps/nm$^2$/km because the absolute value of the fourth order dispersion $\beta_4$ can be further decreased. As seen from FIG. 26, the wavelength derivative of the dispersion slope S (dS/dλ) is preferably about −0.00012 to −0.00008 ps/nm$^3$/km. Furthermore, the wavelength derivative (dS/dλ) of the dispersion slope S is more preferably about −0.00011 to −0.00009 ps/nm$^3$/km because the absolute value of the fourth order dispersion $\beta_4$ can be further reduced.

Figure 27:
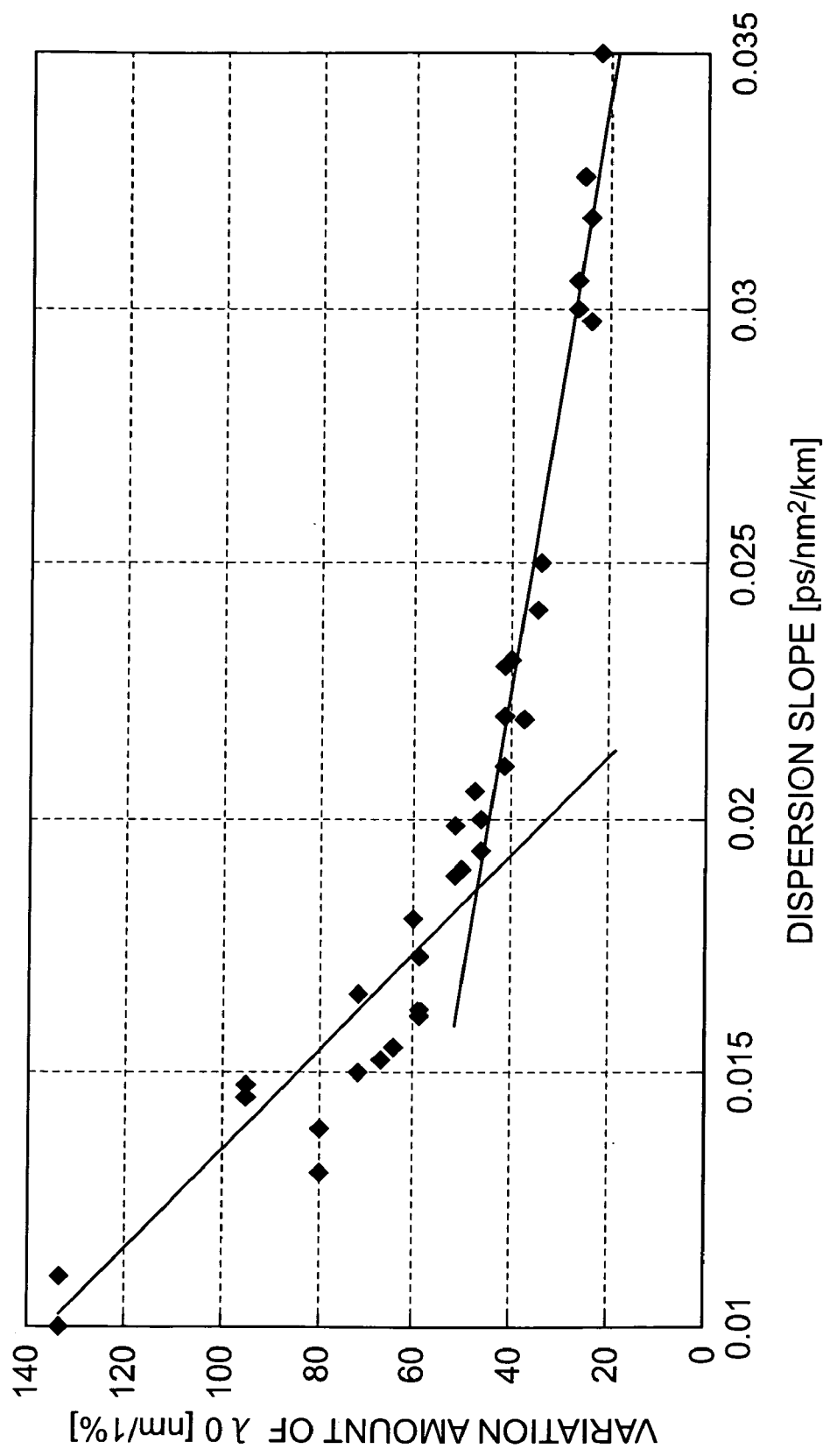

In a highly nonlinear optical fiber, where the dispersion slope S is small, variation in the zero dispersion wavelength $\lambda_0$ becomes large. FIG. 27 is a drawing showing the relationship between variation amount of the zero dispersion wavelength $\lambda_0$ and the dispersion slope S, where the variation of the core diameter 2a is 1%. As seen from this figure, the wavelength conversion bandwidth becomes narrower as the variation of the zero dispersion wavelength $\lambda_0$ increases. Particularly, the dispersion slope S is preferably not less than +0.018 ps/nm$^2$/km because the variation of the zero dispersion wavelength $\lambda_0$ is large in the dispersion slope range of less than +0.018 ps/nm$^2$/km.

Figure 28:
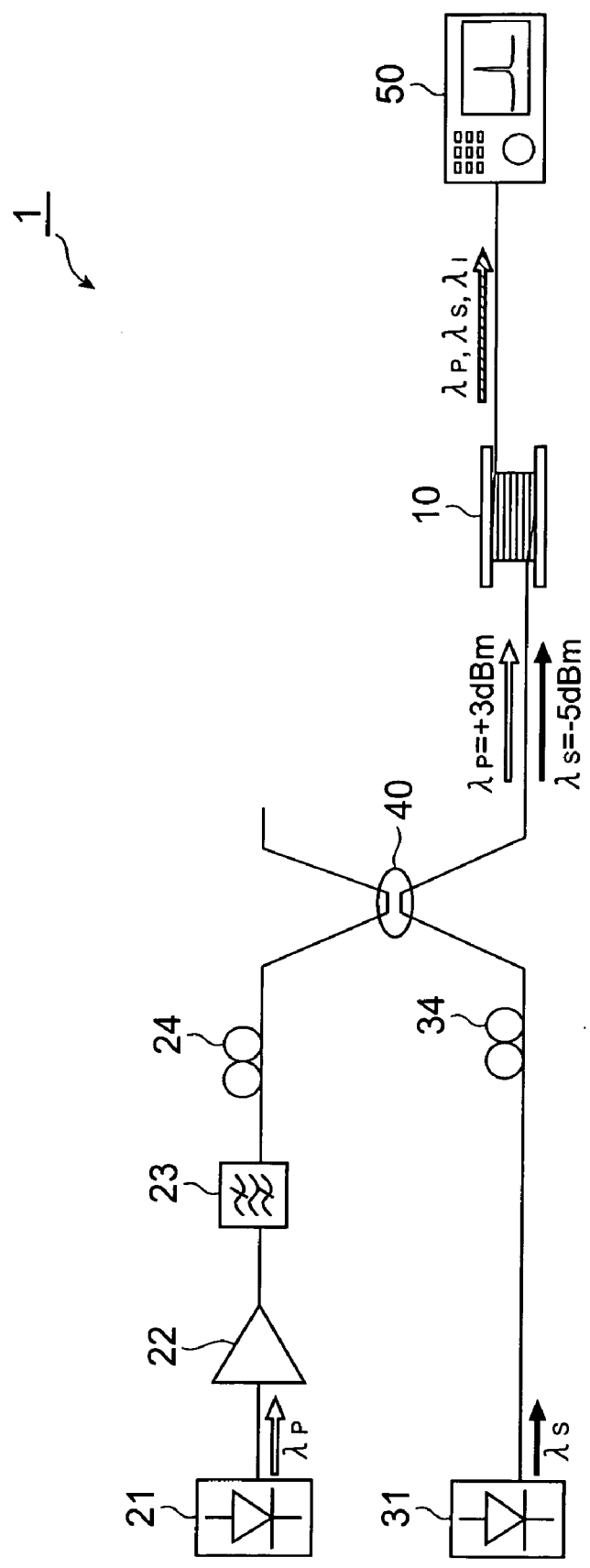
FIG. 28 is a configuration diagram of optical device 1 of an example.

An example of an optical fiber and an optical device according to the present invention will be described below. FIG. 28 is a configuration diagram of optical device 1 of the example. This optical device 1 comprises the above-described optical fiber 10, and further comprises a pump light source 21, an optical amplifier 22, a band-pass filter 23, a polarization controller 24, a probe light source 31, a polarization controller 34, an optical coupler 40, and a spectrum analyzer 50.

The optical fiber 10 used herein has the structure as shown in FIG. 11, which had the following characteristics: the relative index difference $\Delta_+$ of the center core part 11 3.41%, the relative index difference $\Delta_-$ of the depressed part 12 of −0.14%, the ratio Ra of 0.56, the core diameter 2a of 3.78 μm, and the length L of 100 m. This optical fiber 10 had the zero dispersion wavelength $\lambda_0$ of 1562.3 nm, the transmission loss of 1 dB/km at the wavelength of 1.55 μm, the effective area A$_{eff}$ of 9.4 μm$^2$, the mode field diameter of 3.51 μm, the nonlinear coefficient γ of 25/W-km measured by XPM method, and the polarization mode dispersion of 0.03 ps/km$^{1/2}$. This optical fiber 10 had the following characteristics at the zero dispersion wavelength: the dispersion slope S +0.024 ps/nm$^2$/km, the wavelength derivative of the dispersion slope S (dS/dλ) −0.00010 ps/nm$^3$/km, the third order dispersion $\beta_3$ of the propagation constant $\beta$ $4 \times 10^{-41}$ s$^3$/m, and the fourth order dispersion $\beta_4$ +$2 \times 10^{-56}$ s$^4$/m.

The pump light source 21 generates a pump light of wavelength $\lambda_P$. The probe light source 31 generates a probe light of wavelength $\lambda_S$. In the present example the pump wavelength $\lambda_P$ is set near the zero dispersion wavelength of the optical fiber 10. The probe wavelength $\lambda_S$ was swept in an output range (1440-1653 nm) of the wavelength-tunable light source. The optical amplifier 22 optically amplifies the pump light outputted from the pump light source 21, and outputs the amplified pump. The band-pass filter 23 selectively transmits light of the wavelength $\lambda_P$ out of the light emitted from the optical amplifier 22, and outputs the transmitted light. The polarization controller 24 controls the polarization state of the pump $\lambda_P$ outputted from the band-pass filter 23, and outputs the resultant pump. The polarization controller 34 controls the polarization state of the probe $\lambda_S$ outputted from the probe light source 31, and outputs the resultant probe.

The optical coupler 40 receives the pump $\lambda_P$ outputted from the polarization controller 24 and also receives the probe $\lambda_S$ outputted from the polarization controller 34, couples these pump $\lambda_P$ and probe $\lambda_S$, and outputs the coupled lights. The optical fiber 10 receives the pump $\lambda_P$ and probe $\lambda_S$. In the present example, the power $P_{P1-in}$ of the pump $\lambda_P$ injected into the optical fiber 10 was set to +3 dBm and the power $P_{S-in}$ of the probe $\lambda_S$ injected into the optical fiber 10 to −5 dBm, thereby generating an idler $\lambda_I$ by four-wave mixing in this optical fiber 10. The idler wavelength $\lambda_I$ is represented by the equation of "$\lambda_I = (2/\lambda_P - 1/\lambda_S)^{-1}$." The spectrum analyzer 50 receives the light outputted from the optical fiber 10 and measures a spectrum of the light. Particularly, in the present example, the spectrum analyzer 50 measured the power $P_{I-out}$ of the idler $\lambda_I$ emitted from the optical fiber 10.

Figure 29:
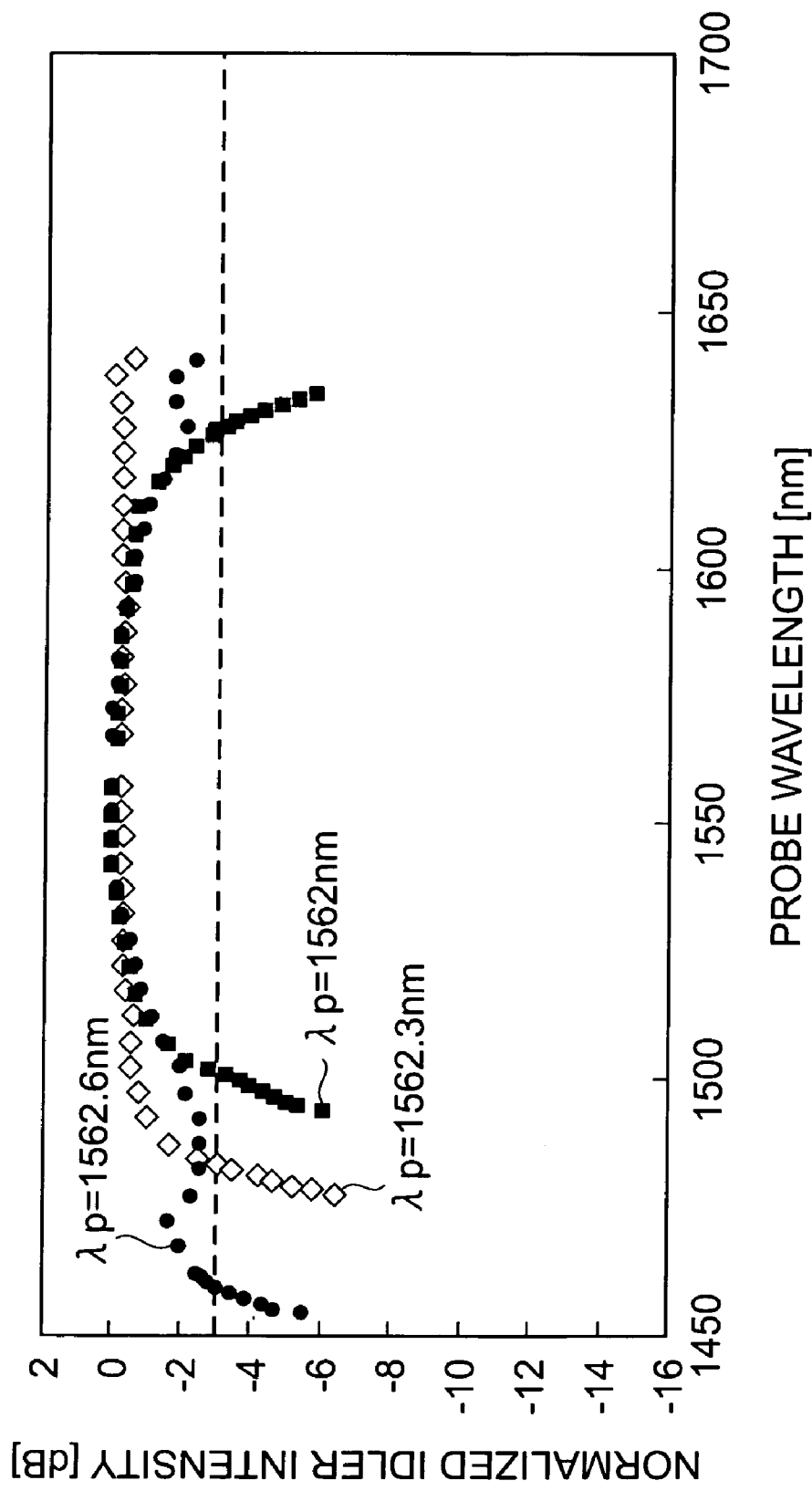
FIG. 29 is a drawing showing the relationship between the power $P_{I\text{-}out}$ of idler $\lambda_I$ emitted from optical fiber 10 of optical device 1 of the example, and the probe wavelength $\lambda_S$.

FIG. 29 is a drawing showing the relationship between the power $P_{I-out}$ of the idler $\lambda_I$ emitted from the optical fiber 10 of the optical device 1 of the example, and the probe wavelength $\lambda_S$. The vertical axis of this drawing is normalized while the maximum of the power $P_{I-out}$ of the idler $\lambda_I$ is defined as 0 dB. This drawing shows the relationship between the idler power $P_{I-out}$ and the probe wavelength $\lambda_S$, for each of the values of the pump wavelength $\lambda_P$, 1562.0 nm, 1562.3 nm, and 1562.6 nm. Since the fourth order dispersion $\beta_4$ of the optical fiber 10 is positive, the wavelength conversion bandwidth is expected to become wide where the pump wavelength $\lambda_P$ is longer than the zero dispersion wavelength $\lambda_0$ of the optical fiber 10.

In fact, as shown in FIG. 29, the wavelength conversion bandwidth was 126 nm at the pump wavelength $\lambda_P$ of 1562.0 nm, the wavelength conversion bandwidth was 168 nm at the pump wavelength $\lambda_P$ of 1562.3 nm, and the wavelength conversion bandwidth was 220 nm at the pump wavelength $\lambda_P$ of 1562.6 nm. Namely, the wavelength conversion bandwidth was widest when the pump wavelength $\lambda_P$ was 1562.6 nm, which is 0.3 nm longer than the zero dispersion wavelength $\lambda_0$.

In the example, however, no evaluation was possible with the probe $\lambda_S$ on the longer wavelength side than 1653 nm, by virtue of the limit of the output wavelength range of the wavelength-tunable light source actually used as the probe light source 31. Therefore, the power $P_{I-out}$ of the idler $\lambda_I$ emitted from the optical fiber 10 was calculated from the aforementioned Eqs (1) to (6) and Eq (16).

Figure 30:
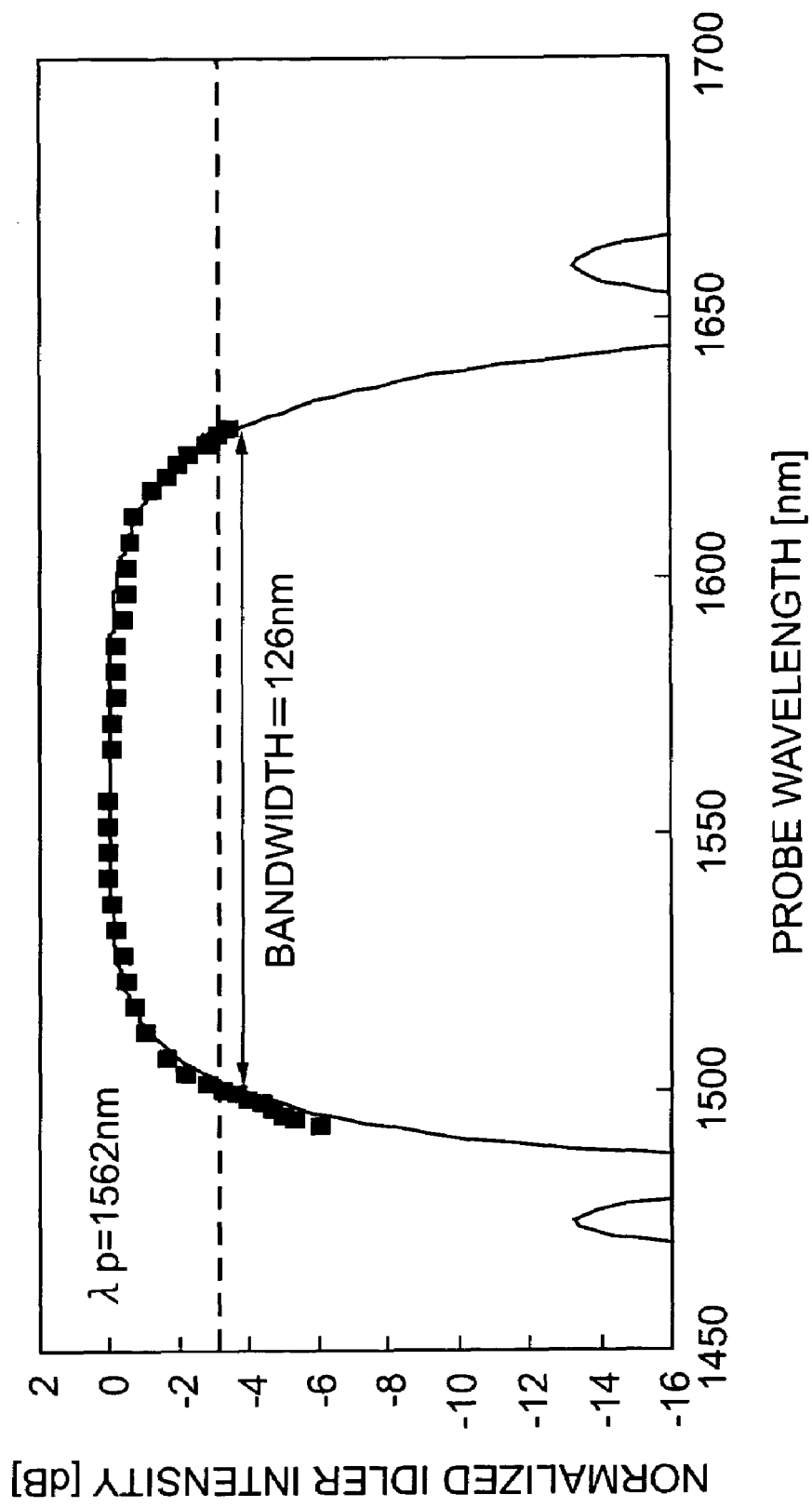
FIG. 30 is a drawing showing the relationship between the power $P_{I-out}$ of idler $\lambda_I$ emitted from optical fiber 10 of optical device 1 of the example, and the probe wavelength $\lambda_S$.
Figure 31:
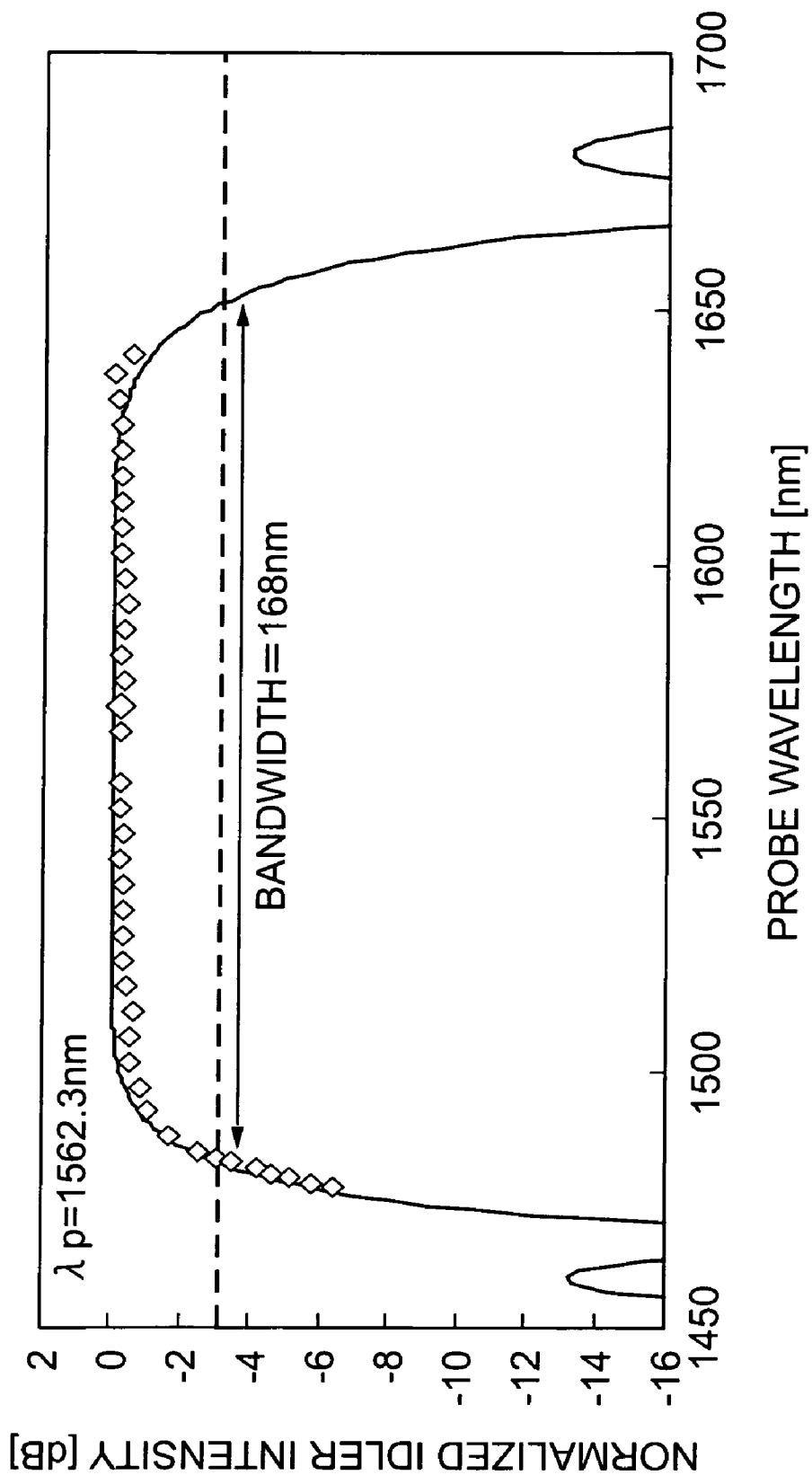
FIG. 31 is a drawing showing the relationship between the power $P_{I-out}$ of idler $\lambda_I$ emitted from optical fiber 10 of optical device 1 of the example, and the probe wavelength $\lambda_S$.
Figure 32:
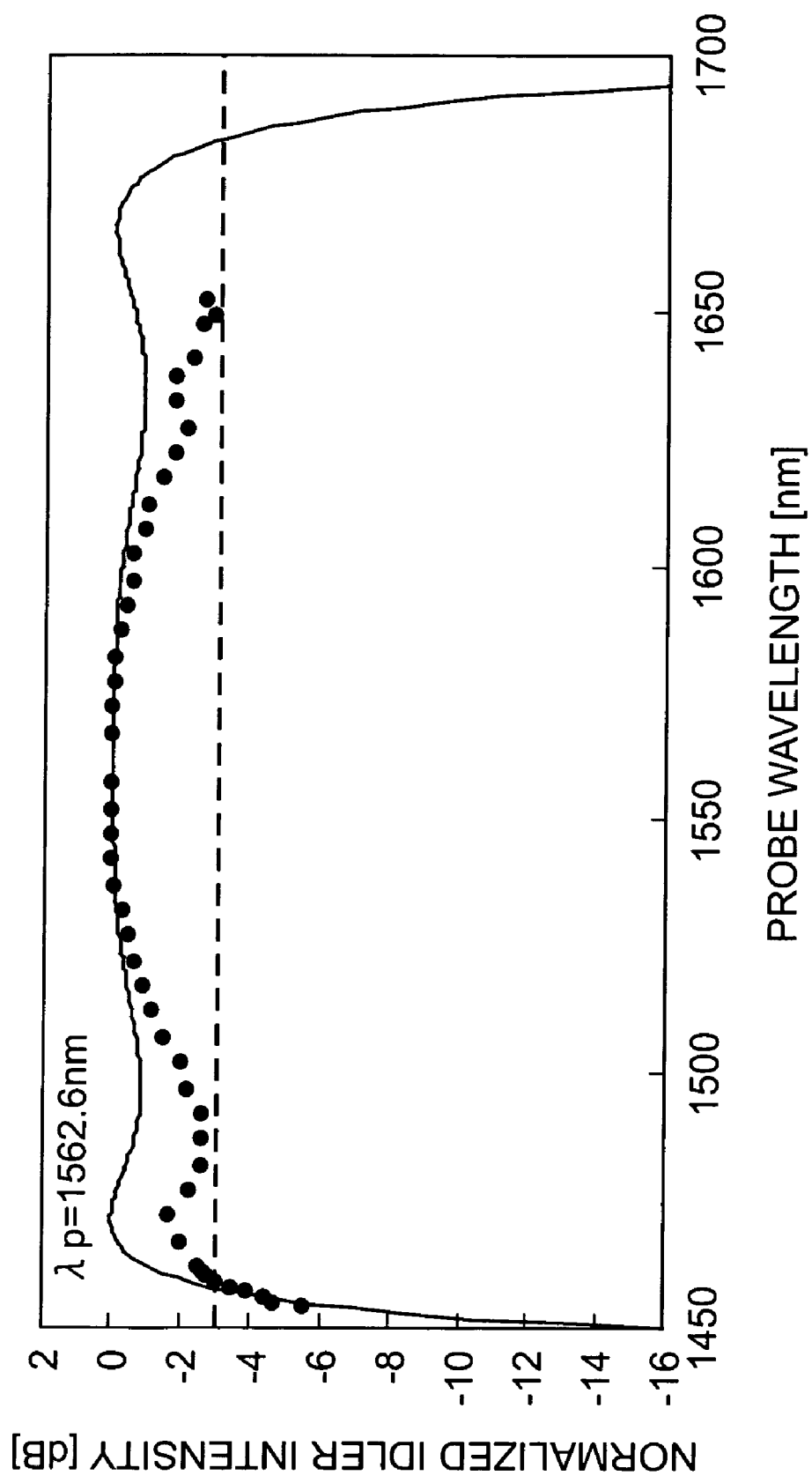
FIG. 32 is a drawing showing the relationship between the power $P_{I-out}$ of idler $\lambda_I$ emitted from optical fiber 10 of optical device 1 of the example, and the probe wavelength $\lambda_S$.

FIG. 30 is a drawing showing the relationship between the power $P_{I-out}$ of the idler $\lambda_I$ emitted from the optical fiber 10 of the optical device 1, and the probe wavelength $\lambda_S$, where the pump wavelength $\lambda_P$ is 1562.0 nm. FIG. 31 is a drawing showing the relationship between the power $P_{I-out}$ of the idler $\lambda_I$ emitted from the optical fiber 10 of the optical device 1, and the probe wavelength $\lambda_S$, where the pump wavelength $\lambda_P$ is 1562.3 nm. FIG. 32 is a drawing showing the relationship between the power $P_{I-out}$ of the idler $\lambda_I$ emitted from the optical fiber 10 of the optical device 1, and the probe wavelength $\lambda_S$, where the pump wavelength $\lambda_P$ is 1562.6 nm. In these drawings, solid lines indicate calculated values of the power $P_{I-out}$ of the idler $\lambda_I$ emitted from the optical fiber 10.

As seen from FIGS. 30 and 31, the calculated values and actually measured values demonstrate extremely good agreement with each other, where the pump wavelength $\lambda_P$ is 1562.0 nm and 1562.3 nm. On the other hand, as seen from FIG. 32, where the pump wavelength $\lambda_P$ is 1562.6 nm, the calculated values and actually measured values agree well with each other, but agreement is not so good on the short wavelength side of the probe $\lambda_S$.

Figure 33:
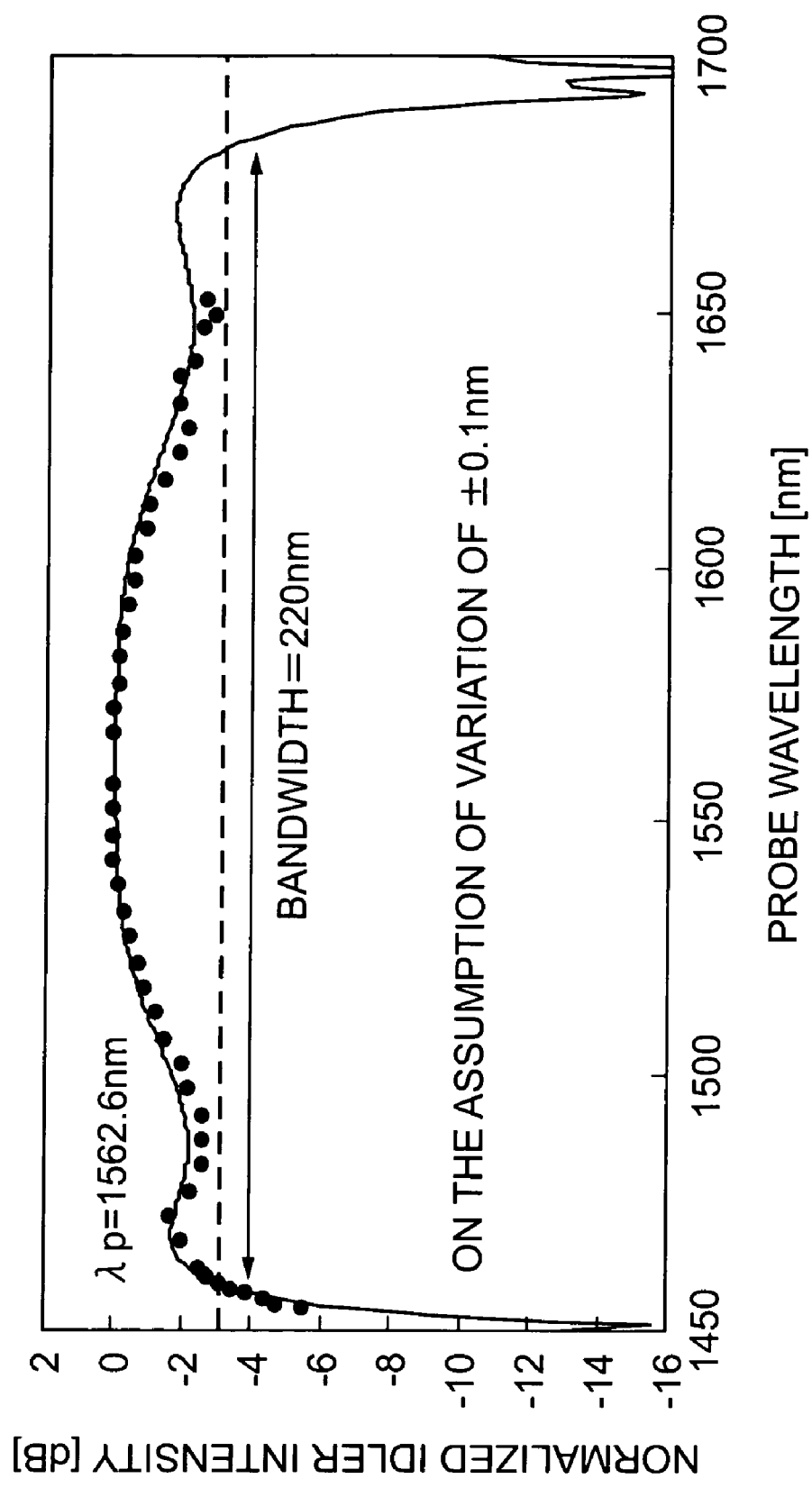
FIG. 33 is a drawing showing the relationship between the power $P_{I-out}$ of idler $\lambda_I$ emitted from optical fiber 10 of optical device 1 of the example, and the probe wavelength $\lambda_S$.

Then the idler intensity was again calculated with variation of ±0.1 nm in the zero dispersion wavelength $\lambda_0$ in the longitudinal direction of optical fiber 10, and the result is as shown in FIG. 33. As shown in this drawing, where the variation in the zero dispersion wavelength $\lambda_0$ is ±0.1 nm, the calculated values and actually measured values demonstrate extremely good agreement with each other. In this optical fiber 10, therefore, the wavelength conversion bandwidth is wide, not less than 100 nm, even if the pump wavelength $\lambda_P$ is not optimized, and the wavelength conversion bandwidth is extremely wide, 220 nm, if the pump wavelength $\lambda_P$ is optimized. The variation in the zero dispersion wavelength $\lambda_0$ can be estimated as approximately ±0.1 nm. This result doubles the conversion bandwidth of 90-110 nm conventionally known.

Figure 34:
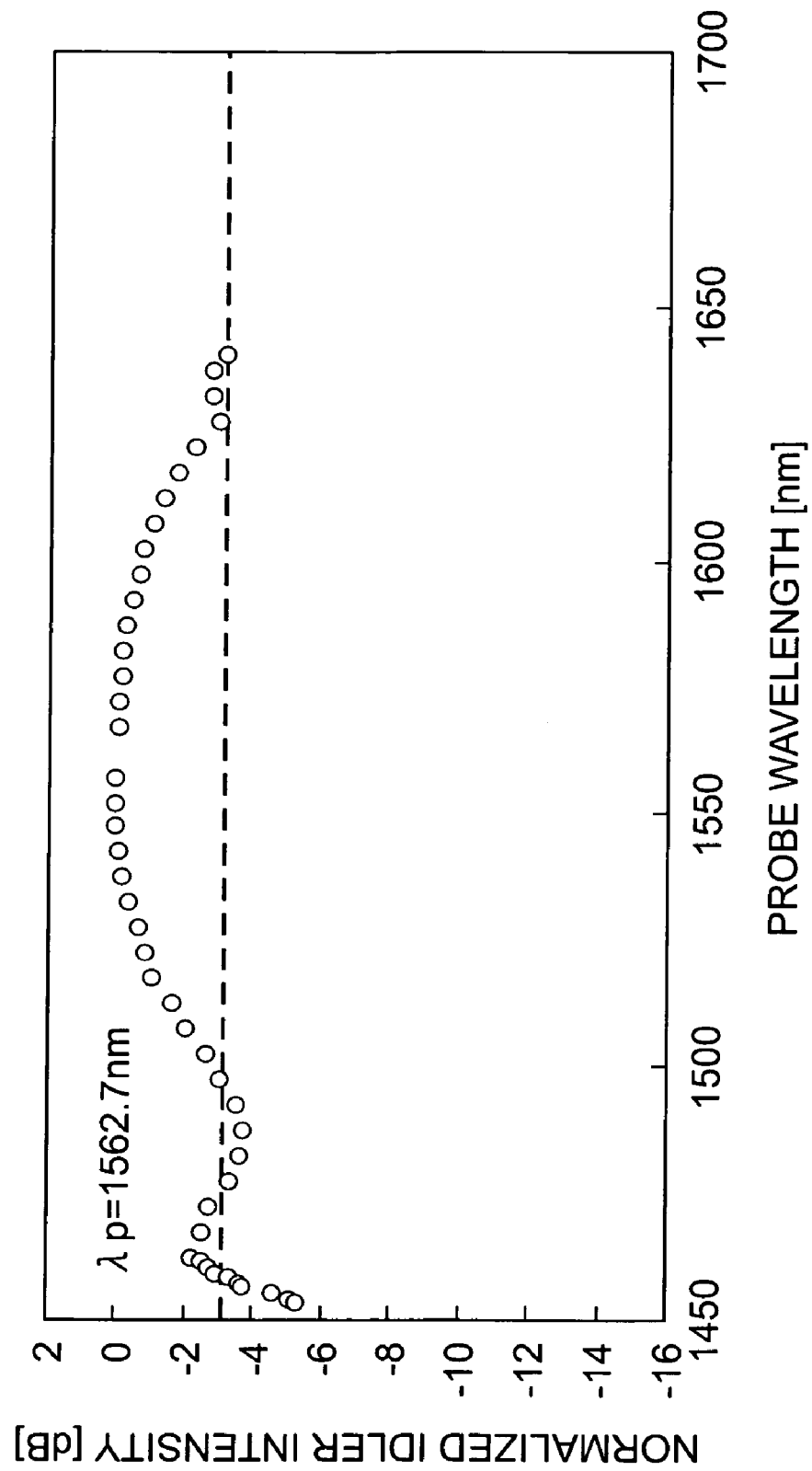
FIG. 34 is a drawing showing the relationship between the power $P_{I-out}$ of idler $\lambda_I$ emitted from optical fiber 10 of optical device 1 of the example, and the probe wavelength $\lambda_S$.

FIG. 34 is a drawing showing the relationship between the power $P_{I-out}$ of the idler $\lambda_I$ emitted from the optical fiber 10 of the optical device 1, and the probe wavelength $\lambda_S$, where the pump wavelength $\lambda_P$ is 1562.7 nm. When the probe wavelength $\lambda_S$ is made further longer to 1562.7 nm as in this example, the wavelength conversion band is not continuous but is divided into two bands. However, high wavelength conversion efficiency is achieved even if the probe wavelength $\lambda_S$ is far from the pump wavelength $\lambda_P$. Although the wavelength conversion bandwidth defined within 3 dB becomes narrower, optical devices such as OPA and switches can avoid the problem of four-wave mixing or the like between probes because the probe wavelength $\lambda_S$ is so far from the pump wavelength $\lambda_P$ as to make the dispersion at the probe wavelength relatively large.

Figure 35:
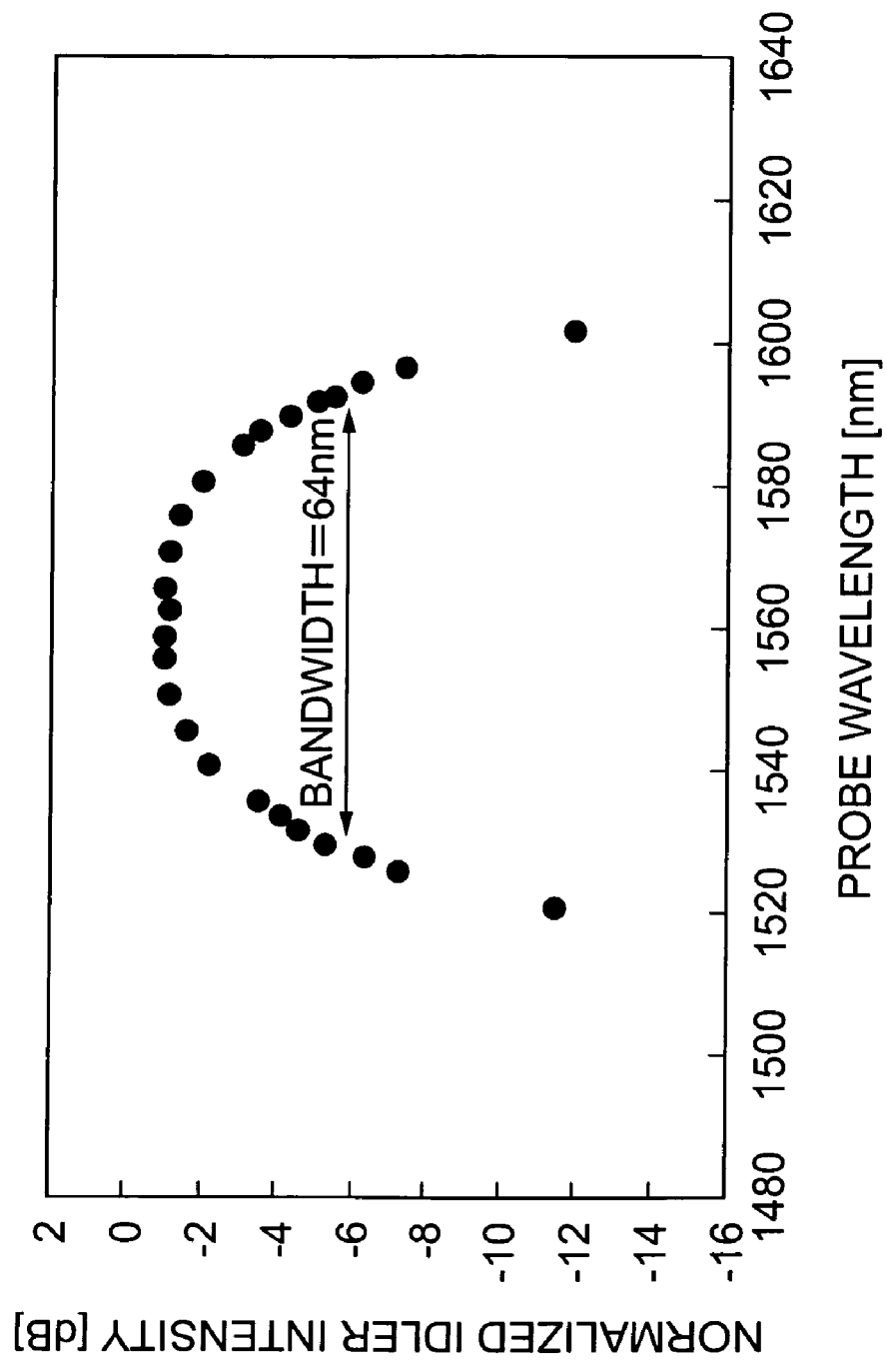
FIG. 35 is a drawing showing the relationship between the power $P_{I-out}$ of idler $\lambda_I$ and the probe wavelength $\lambda_S$, where the length of the optical fiber of the example is 1000 m.
Figure 36:
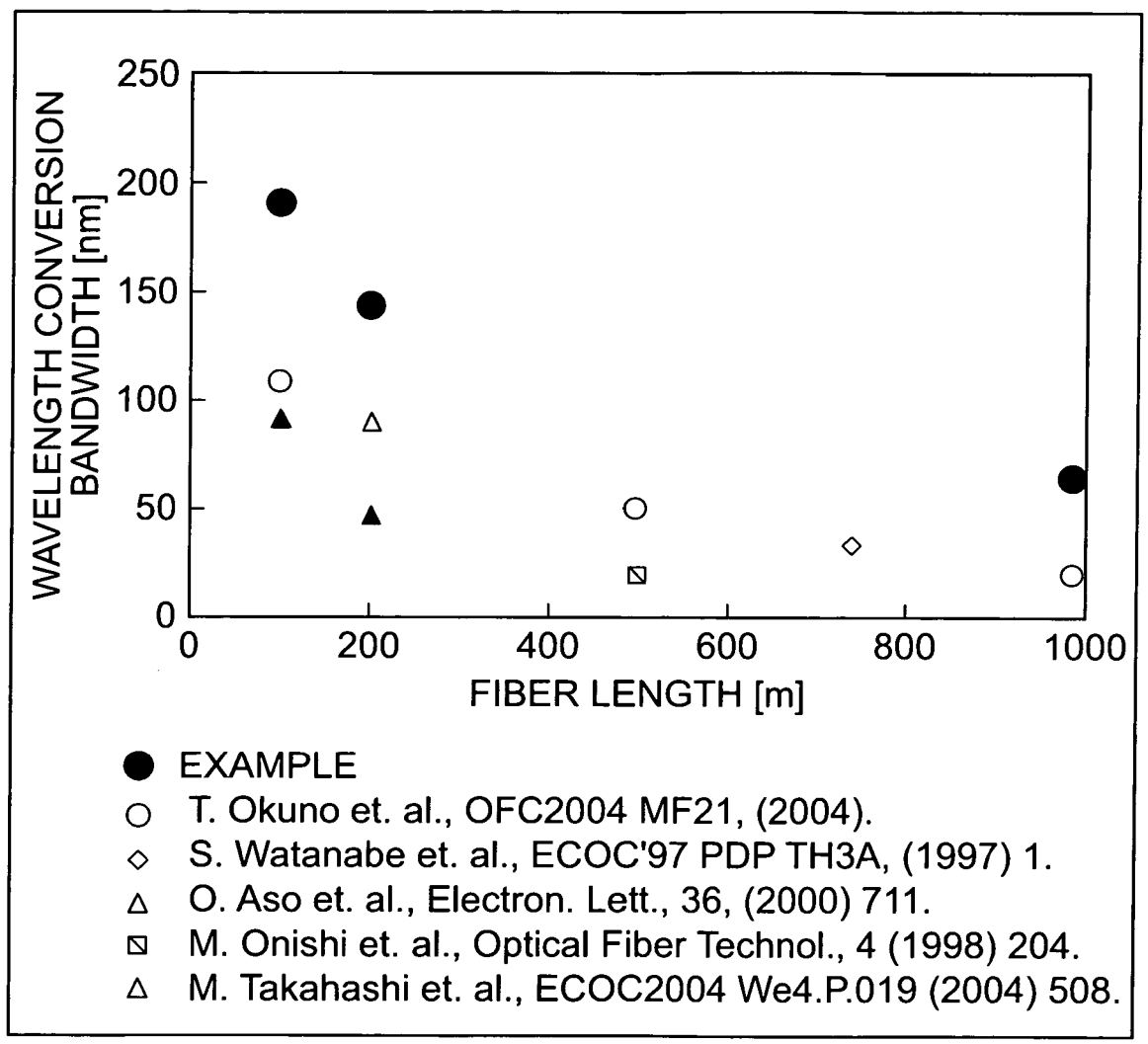
FIG. 36 is a drawing showing the relationship between the wavelength conversion bandwidth and the fiber length in each of optical fibers of the example and conventional examples.

FIG. 35 is a drawing showing the relationship between the power $P_{I-out}$ of the idler $\lambda_I$ and the probe wavelength $\lambda_S$, where the length of the optical fiber of the example is 1000 m. FIG. 36 is a drawing showing the relationship between the wavelength conversion bandwidth and the fiber length of optical fiber for each of the example and the conventional examples. As seen from the aforementioned Eq (7) and shown in FIG. 9, the wavelength conversion bandwidth becomes narrower with increasing fiber length L. In the case of the ordinary optical fibers not being polarization-maintaining fibers, there arises the additional problem of coupling between two polarization modes, and thus the conventional fibers never had the wavelength conversion bandwidth of not less than 50 nm in the length of not less than 500 m and the wavelength conversion bandwidth of about 20 nm in the length of 1000 m. In contrast to it, the optical fiber of the example experimentally made had the significant effect of decrease of the fourth order dispersion $\beta_4$ and the significantly expanded wavelength conversion bandwidth of 64 nm even in the fiber length of 1000 m.

As described above, it is seen that the optical fiber of the present invention comes to have the extremely wide wavelength conversion bandwidth of not less than 100 nm (preferably not less than 150 nm and more preferably not less than 200 nm) by controlling the absolute value of the fourth order dispersion $\beta_4$ to not more than $5\times10^{-56}$ s$^4$/m and controlling the variation of the zero dispersion wavelength $\lambda_0$ to not more than ±0.6 nm. Since the parametric process efficiently occurs in the extremely wide wavelength range, it becomes feasible to readily substantialize optical fiber type devices and applications, such as wavelength conversion and OPA, optical switches, optical demultiplexers, and sampling oscilloscopes in communication and non-communication uses.

The above embodiments according to the present invention enables achievement of a wider bandwidth in the wavelength conversion, OPA, and so on.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber wherein an absolute value of the fourth order dispersion $\beta_4$ of fourth derivative $\beta_4$ of propagation constant $\beta$ with respect to angular frequency $\omega$ at a mean zero dispersion wavelength $\lambda_0$ in an overall length is not more than $5\times10^{-56}$ s$^4$/m and wherein a fluctuation of a zero dispersion wavelength along a longitudinal direction is not more than ±0.6 nm.

2. The optical fiber according to claim 1 wherein the mean zero dispersion wavelength $\lambda_0$ is in the range of 1440 nm to 1640 nm.

3. The optical fiber according to claim 1, wherein an effective area at the mean zero dispersion wavelength $\lambda_0$ is not more than 15 μm$^2$.

4. The optical fiber according to claim 1, wherein a dispersion slope at the mean zero dispersion wavelength $\lambda_0$ is not less than +0.018 ps/nm$^2$/km.

5. The optical fiber according to claim 1, wherein a wavelength derivative of a dispersion slope at the mean zero dispersion wavelength $\lambda_0$ is in the range of −0.00012 ps/nm$^3$/km to −0.00008 ps/nm$^3$/km.

6. The optical fiber according to claim 1, wherein a polarization mode dispersion at the overall length is not more than 0.2 ps.

7. The optical fiber according to claim 1, wherein a crosstalk between orthogonal polarization modes of the fundamental mode light guided is not more than −15 dB at the overall length.

8. The optical fiber according to claim 1, comprising at least a center core part having a maximum refractive index $N_1$ and an outside diameter 2$a$, a depressed part surrounding the center core part and having a minimum refractive index $N_2$ and an outside diameter 2$b$, and a cladding part surrounding the depressed part and having a maximum refractive index $N_3$, wherein the refractive indices satisfy a relation of "$N_1 > N_3 > N_2$,"

wherein with respect to the refractive index $N_3$ of the cladding part, a relative index difference of the center core part is defined as $\Delta_+$ and a relative index difference of the depressed part as $\Delta_-$, and a difference "$\Delta_+ - \Delta_-$" is not less than 2.2%, and wherein a ratio Ra of the respective outside diameters of the center core part and the depressed part (=2$a$/2$b$) is in the range of 0.2 to 0.7.

9. The optical fiber according to claim 8 wherein said difference "$\Delta_+ - \Delta_-$" is not less than 3.1%.

10. The optical fiber according to claim 8, wherein the relative index difference $\Delta_-$ of the depressed part is in the range of −0.1% to −1.1%.

11. The optical fiber according to claim 1, wherein the fiber length is not more than 500 m.

12. An optical fiber wherein a mean zero dispersion wavelength $\lambda_0$ in an overall length is in the range of 1440 nm to 1640 nm, wherein a fluctuation of a zero dispersion wavelength along a longitudinal direction is not more than ±0.6 nm, and wherein an absolute value of the fourth order dispersion $\beta_4$ of the fourth derivative $\beta_4$ of propagation constant $\beta$ with respect to angular frequency $\omega$, at the mean zero dispersion wavelength $\lambda_0$ is not more than $5\times10^{-56}$ s$^4$/m, an effective area is not more than 15 μm$^2$, a dispersion slope is in the range of +0.018 ps/nm$^2$/km to +0.030 ps/nm$^2$/km, and a wavelength derivative of the dispersion slope is in the range of −0.00012 ps/nm$^3$/km to −0.00008 ps/nm$^3$/km.

* * * * *